US008533124B2

(12) United States Patent
Ryuutou

(10) Patent No.: US 8,533,124 B2
(45) Date of Patent: Sep. 10, 2013

(54) DIGITAL MATERIAL MANAGEMENT METHOD, DIGITAL MATERIAL MANAGEMENT SYSTEM, AND WORKFLOW MANAGEMENT SYSTEM

(75) Inventor: Masayuki Ryuutou, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 485 days.

(21) Appl. No.: 12/646,445

(22) Filed: Dec. 23, 2009

(65) Prior Publication Data

US 2010/0168888 A1 Jul. 1, 2010

(30) Foreign Application Priority Data

Dec. 26, 2008 (JP) ................................. 2008-334521

(51) Int. Cl.
*G06Q 10/00* (2012.01)
*G06K 15/00* (2006.01)
*G06F 3/12* (2006.01)
*H04N 1/60* (2006.01)

(52) U.S. Cl.
USPC ............ 705/301; 700/97; 700/110; 358/1.14; 358/1.15; 358/1.9

(58) Field of Classification Search
USPC .......... 358/1.14, 1.15, 1.9; 705/301; 700/97, 700/110
See application file for complete search history.

(56) References Cited

U.S. PATENT DOCUMENTS

| 5,963,641 | A * | 10/1999 | Crandall et al. .................. 380/2 |
| 6,429,947 | B1 * | 8/2002 | Laverty et al. ............... 358/1.15 |
| 6,608,697 | B1 * | 8/2003 | Schorr et al. ................. 358/1.15 |
| 7,596,244 | B2 * | 9/2009 | Farrell .......................... 382/112 |
| 7,675,636 | B2 * | 3/2010 | Yamashita .................... 358/1.14 |
| 2004/0034834 | A1 * | 2/2004 | Pirie et al. ...................... 715/527 |
| 2005/0068547 | A1 | 3/2005 | Negishi et al. |
| 2005/0151981 | A1 * | 7/2005 | Levine et al. .................. 358/1.9 |
| 2006/0221381 | A1 * | 10/2006 | Morales ....................... 358/1.15 |
| 2009/0031216 | A1 * | 1/2009 | Dressel et al. ................ 715/255 |

FOREIGN PATENT DOCUMENTS

| JP | 8-292546 A | 11/1996 |
| JP | 9-90599 A | 4/1997 |
| JP | H09-090599 | * 4/1997 |
| JP | 2002-329211 A | 11/2002 |
| JP | 2003-263424 A | 9/2003 |
| JP | 2005-129011 A | 5/2005 |

OTHER PUBLICATIONS

Ingo Schmitt et al., "Image Database Search Using Fuzzy and Quantum Logic," Fuzzy Systems Conference 2007, IEEE International (Aug. 2007), 1-6.*

* cited by examiner

*Primary Examiner* — Candice D Wilson
*Assistant Examiner* — Jonathan Lindsey, III
(74) *Attorney, Agent, or Firm* — Birch, Stewart, Kolasch & Birch, LLP

(57) ABSTRACT

An aspect of the present invention provides a digital material management method including a verification step of automatically verifying, in manufacturing of a product in which digital materials are used, digital materials that should be used and digital materials that are actually used in the product. According to the digital material management method of the present invention, whether the entire digital materials that should be used in the product manufactured using the digital materials are arranged and used is automatically checked, and the result is displayed. Therefore, the use of the digital materials that should be used in the product can be automatically checked. The efficiency is improved, and the power can be saved.

15 Claims, 36 Drawing Sheets

FIG.1

| ITEM IMAGE | ITEM INFORMATION | PRINTED MATERIAL 1 | PRINTED MATERIAL 2 | PRINTED MATERIAL 3 |
|---|---|---|---|---|
| IMAGE 1 | ITEM NAME 1<br>ITEM NUMBER 1<br>PRICE 1 | USED | UNUSED | UNUSED |
| IMAGE 2 | ITEM NAME 2<br>ITEM NUMBER 2<br>PRICE 2 | UNUSED | USED | UNUSED |
| IMAGE 3 | ITEM NAME 3<br>ITEM NUMBER 3<br>PRICE 3 | ONLY IMAGE IS USED, INFORMATION IS NOT USED | USED | USED |

FIG.7

| SERVER FUNCTION | REMOTE SERVER APPARATUS | PRINT PROCESS SERVER APPARATUS |
|---|---|---|
| WEB SERVER FUNCTION | ○ | ○ |
| JOB REGISTRATION FUNCTION | ○ | |
| JOB MANAGEMENT FUNCTION | ○ | |
| USER MANAGEMENT FUNCTION | ○ | |
| DRAFT SAVING FUNCTION | ○ | |
| THUMBNAIL CREATION FUNCTION | ○ | |
| PAGE PDF CREATION FUNCTION | ○ | |
| PAGE OPERATION INFORMATION SAVING FUNCTION | ○ | |
| DIVIDED IMAGE TRANSMISSION FUNCTION | ○ | |
| PROOFREADING INFORMATION SAVING FUNCTION | ○ | |
| PROOFREAD PDF CREATION FUNCTION | ○ | |
| JOB APPROVAL FUNCTION | ○ | |
| PREFLIGHT FUNCTION | | ○ |
| VERSION DIVIDING RIP FUNCTION | | ○ |
| PRINT JOB REGISTRATION FUNCTION | | ○ |

FIG.9

| TERMINAL FUNCTION | SUBMISSION TERMINAL | PROOFREADING TERMINAL | JOB CREATION/MANAGEMENT TERMINAL |
|---|---|---|---|
| WEB BROWSING FUNCTION | ○ | ○ | ○ |
| JOB CREATION FUNCTION | | | ○ |
| DRAFT TRANSMISSION FUNCTION | ○ | | |
| PAGE OPERATION FUNCTION | ○ | | |
| PROOFREADING FUNCTION | | | |
| DIVIDED IMAGE SYNTHESIS FUNCTION | | | |
| VERSION INSPECTION IMAGE CREATION FUNCTION | | ○ | |
| PROOFREADING INFORMATION GENERATION FUNCTION | | | |
| PROOFREADING CHECKING FUNCTION | ○ | | |
| APPROVAL FUNCTION | | ○ | |
| PRINT INSTRUCTION FUNCTION | | | ○ |
| SERVER MANAGEMENT FUNCTION | | | ○ |

FIG.14

| Job ID | Job Name | The Number of Pages | Proofread Date | Update Date | Submission | Proofreading | Authentication | Job Issue | Version Division | 3D View |
|---|---|---|---|---|---|---|---|---|---|---|
| 12345 | JOB1 | 100 | 2008/04/01 | 2008/03/01 | 0% | Ready | ✓ | 0% | | |
| 12346 | JOB2 | 200 | 2008/04/02 | 2008/03/02 | 50% | 10/185 | ☐ Ready | 50% | △ | |
| 12347 | JOB3 | 300 | | | ✓ 100% | | | | | |
| 12348 | JOB4 | 50 | 2008/03/04 | 2008/03/04 | 50% | 0/50 | | | | |

Job List
There is a preflight error. Check from the job detail. — 114
Job Name: Japanese    State: Submission    Search

102B

? Help    Logout

Job Detail Screen

| | |
|---|---|
| Job ID | : 12345 |
| XMFJob ID | : XMF12345 |
| Job Name | : JOB3 |
| Version | : 123.456.789 |
| Last Updated | : 2008/2/27 |
| Job Owner | : User A |
| Draft Provider | : User B |
| Proofreader | : Proofreader A/Proofreader B/Proofreader C/Proofreader D |
| Approver | : Approver Z |
| Status | : Review |
| Output Printer | : DocuCentre1234 |

Submitted File
| | |
|---|---|
| File Name | : abc.pdf |
| Submitted Date | : 2008/2/13 |
| The Number of Pages | : 100 |
| Preflight Result | : 3 Errors/10 Warnings |

Review Status

| Reviewer | Not Reviewed | OK | NG |
|---|---|---|---|
| Proofreader A | 5 | 2 | 3 |

Rollback

Check Details

Help   Logout

To Job List Screen 118
120

FIG.19

| Job ID | Job Name | The Number of Pages | Proofread Date | Update Date | Submission | Proofreading | Authentication | Job Issue | Version Division | 3D View |
|---|---|---|---|---|---|---|---|---|---|---|
| 12345 | JOB1 | 100 | 2008/04/01 | 2008/03/01 | 0% | Ready | ✓ | 0% | | |
| 12346 | JOB2 | 200 | 2008/04/02 | 2008/03/02 | 50% | 10/185 | ☐ Ready | 50% | ✓ | |
| 12347 | JOB3 | 300 | 2008/04/03 | 2008/03/03 | ✓ 100% | 98/200 | ✓ | ✓ 100% | ✓ | ✓ |
| 12348 | JOB4 | 50 | 2008/03/04 | 2008/03/04 | 50% | 0/50 | | | ⚠ | |

| 🔒 Login |
|---|
| Displayed Language : [Japanese ▼] |
| Login ID : [f-company] |
| Password : [********] |
| [Login] |

FIG.24

Job List
ⓘ There are XX jobs that reviewing is not finished
Job Name: Japanese    State: Submission ⌄

[Search]

| Job ID | Job Name | The Number of Pages | Proofread Date | Update Date | Submission | Proofreading | Authentication | Job Issue | Version Division | 3D View |
|--------|----------|---------------------|----------------|-------------|------------|--------------|----------------|-----------|------------------|---------|
| 12345 | JOB1 | 100 | 2008/04/01 | 2008/03/01 | ☐☐ 0% | ☐ Ready | ✓ | ☐ 0% | | |
| 12346 | JOB2 | 200 | 2008/04/02 | 2008/03/02 | ⬆ 50% | 10/185 | ☐ Ready | ⬆ 50% | ✓ | |
| 12347 | JOB3 | 300 | 2008/04/03 | 2008/03/03 | ✓ 100% | 0/200 | | | ⚠ | |
| 12348 | JOB4 | 50 | 2008/03/04 | 2008/03/04 | ⬆ 50% | 0/50 | | | | |

FIG.25

Page List
Job ID : 12345
Job Name : JOB3

ⓘ There are unallocated pages. Select [Page Operation] tab and edit.

206A

Current Page Configuration List | Page Operation

Proofread: OK  Proofread: NG

☑ Display Proofreader Field

Select All Pages | Cancel Page Selection

| | 1 | 2 Finished | 3 | 4 | 5 |
|---|---|---|---|---|---|
| | G1 | G2 | G3-1, G3-2, G3-3 | G4-1, G4-2, G4-3, G4-4, G4-5, G4-6, G4-7 | G5 |
| Proofreader A | ✓ | ✓ | ✓ | ✓ | ✓ |
| Proofreader B | ✓ | ✓ | ✓ | ✓ | ✓ |
| Proofreader C | ✓ | ✓ | | ✓ | ✓ |
| Proofreader D | ✓ | ✓ | ✓ | ✓ | ✓ |
| | 6 | 7 | 8 | 9 Finished | 10 |

To Job Detail Screen

FIG.27

Page List
Job ID : 12345
Job Name : JOB3

ⓘ There are unallocated pages. Select [Page Operation] tab and edit.

| Current Page Configuration List | Page Operation |
|---|---|

Proofread: OK  
Proofread: NG

☑ Display Proofreader Field

[Select All Pages] [Cancel Page Selection]

| | 1 | 2 | 3 | 4 | 5 |
|---|---|---|---|---|---|
| | G1 | G2 | Finished — G3-1, G3-2, G3-3 | G4-1, G4-2, G4-3, G4-4, G4-5, G4-6 | G5 |
| Proofreader A | ✓ | ✓ | ✓ | ✓ | ✓ |
| Proofreader B | ✓ | ✓ | NG | ✓ | ✓ |
| Proofreader C | ✓ | ✓ | ✓ | ✓ | ✓ |
| Proofreader D | ✓ | ✓ | ✓ | ✓ | ✓ |
| | 6 | 7 | 8 | 9 Finished | 10 Finished |

To Job Detail Screen

? Help    Logout

FIG.28

| Job ID | Job Name | The Number of Pages | Proofread Date | Update Date | Submission | Proofreading | Authentication | Job Issue | Version Division | 3D View |
|---|---|---|---|---|---|---|---|---|---|---|
| 12345 | JOB1 | 100 | 2008/04/01 | 2008/03/01 | ☐☐ 0% | ☐ Ready | ✓ | ☐ 0% | ☐ | ☐ |
| 12346 | JOB2 | 200 | 2008/04/02 | 2008/03/02 | ⇱ 50% | 10/185 | ☐ Ready | ⇱ 50% | | |
| 12347 | JOB3 | 300 | 2008/04/03 | 2008/03/03 | ✓ 100% | 98/200 | ✓ | ✓ 100% | ✓ | ✓ |
| 12348 | JOB4 | 50 | 2008/03/04 | 2008/03/04 | ⇱ 50% | 0/50 | | | △ | |

Job List
There are XX jobs that reviewing is not finished
Job Name: Japanese     State: Submission 300A
302

| Job ID | Job Name | The Number of Pages | Proofread Date | Update Date | Submission | Proofreading | Authentication | Job Issue | Version Division | 3D View |
|---|---|---|---|---|---|---|---|---|---|---|
| 12345 | JOB1 | 100 | 2008/04/01 | 2008/03/01 | 0% | Ready | ✓ | 0% | | |
| 12346 | JOB2 | 200 | 2008/04/02 | 2008/03/02 | 50% | 10/185 | Ready | 50% | | ✓ |
| 12347 | JOB3 | 3 | 2008/04/03 | 2008/03/03 | 100% | 98/200 | ✓ | 100% | ✓ | |
| 12348 | JOB4 | | 2008/03/04 | 2008/03/04 | 50% | 0/50 | | | | |

Job List
There are XX jobs that reviewing is not finished
Job Name: Japanese    State: Submission    Search — 332

| PAGE | PAGE 1 | PAGE 2 | PAGE 3 | PAGE 4 |
|---|---|---|---|---|
| VERSION OF PAGE | VERSION 1 | VERSION 1 | VERSION 1 | VERSION 1 |
| | VERSION 2 | VERSION 2 | | VERSION 2 |
| | | | | VERSION 3 |

FIG.36

| VERSION OF PRINTED MATERIAL | PAGE 1 | PAGE 2 | PAGE 3 | PAGE 4 |
|---|---|---|---|---|
| VERSION 1 | VERSION 1 | VERSION 1 | NO PAGE DRAFT | NO PAGE DRAFT |
| VERSION 2 | VERSION 1 | VERSION 2 | VERSION 1 | NO PAGE DRAFT |
| VERSION 3 | VERSION 2 | VERSION 2 | VERSION 1 | VERSION 1 |
| VERSION 4 | VERSION 2 | VERSION 2 | VERSION 1 | VERSION 2 |
| VERSION 5 | VERSION 2 | VERSION 2 | VERSION 1 | VERSION 3 |

DIGITAL MATERIAL MANAGEMENT METHOD, DIGITAL MATERIAL MANAGEMENT SYSTEM, AND WORKFLOW MANAGEMENT SYSTEM

BACKGROUND OF THE INVENTION

1. Field of the Invention

The present invention relates to a digital material management method, a digital material management system, and a workflow management system, and particularly, to a management technique of digital materials used in a printed material, such as a catalog and an advertisement, a homepage, etc.

2. Description of the Related Art

Digital materials (for example, product images and information related to the product) are used to create a printed material, such as an advertisement and a catalog, and a website that can be browsed on a web browser. A DAM (digital material management system) manages the digital materials, and a system for sharing the digital materials between a designer, an advertising agency, a client, and a printing company is proposed.

For example, Japanese Patent Application Laid-Open No. 9-90599 describes a workflow management system in which a design division and a version making division include different databases. The same ID (identifier) is used in the design division and the version making division to manage image component data, and the image components are always handled by a uniform coding system.

SUMMARY OF THE INVENTION

However, in the workflow management method described in Japanese Patent Application Laid-Open No. 9-90599, although the common management of image components is possible with the collaboration of the database of the design division and the database of the version making division, there is a problem that whether designated image components are actually used in a target printed material, etc., cannot be examined.

The present invention has been made in view of the foregoing problem, and an object of the present invention is to provide a digital material management method, a system, and a workflow management system that allow recognizing whether entire digital materials that should be used are used.

To attain the object, the present invention provides a digital material management method comprising a verification step of automatically verifying, in manufacturing of a product in which digital materials are used, digital materials that should be used and digital materials that are actually used in the product.

According to the present invention, whether the entire digital materials that should be used in the product manufactured using the digital materials are arranged and used is automatically checked. Therefore, the use of the digital materials that should be used in the product can be automatically checked. The efficiency is improved, and the power can be saved. In the present invention, it is preferable to display the result of automatic checking.

The "digital materials" include objects recognized as images, characters, symbols, etc., in the product, and identification information such as file names and codes are provided thereto.

The digital material management method according to an aspect of the present invention further comprises: a submission step of submitting a draft of the product; and a preflight processing step of applying a preflight process to the verified product after the verification step. In the aspect, "a preflight process" means a process of checking if the verified product is suitable for outputting or printing.

Preferably, the submission step according to the aspect is performed through a submission terminal device. Preferably, the preflight step is performed through a management terminal.

Preferably, the digital material management method according to the present invention further comprises a selection step of selecting the digital materials that should be used from a plurality of digital materials. Preferably, in the verification step, whether all digital materials that should be used are used is verified, and if not all digital materials that should be used are used, the unused digital materials are selected in the selection step.

In the digital material management method according to another aspect of the present invention, in the selection step, the digital materials are assumed to be selected by checking out the digital materials to be used.

The "checking out" according to the aspect is a concept including a process of setting a flag indicating that a digital material is selected when the digital material is selected and associating information of the product, in which the digital material is used, with the digital material.

The digital material management method according to another aspect of the present invention further comprises a registration step of registering in advance the digital materials selected in the selection step.

Preferably, in the registration step, at least one of a requester that has requested manufacturing of the product and a manufacturer of the digital materials registers the digital materials. Preferably, a display step of displaying result of the verification step is included.

The product in which the digital materials according to the present invention are used includes at least one of a printed material and web contents that can be browsed by a web browser function. The printed material includes a document printed material such as an advertisement and a catalog.

In the digital material management method according to an aspect of the present invention, the digital materials include images and information associated with the images.

According to the aspect, images and information associated with the images are collectively managed as digital materials, and the performance of the product can be improved.

Preferably, the images include item images, and the information is item information including at least one of item name, item number, and price.

Preferably, the digital material management method according to another aspect of the present invention comprises a proofreading step of proofreading the product after the preflight processing step.

The proofreading step is a step of checking the finished state based on the draft (or simulation) before ultimately starting to manufacture the product, discovering a modification part, and instructing the modification.

Preferably, a display step of displaying the verification result in the verification step in a list format is included. Preferably, the product includes a plurality of pages, and the verification result is displayed page by page in the display step. Preferably, the display device displays matching or mismatching of the digital materials that should be used and the digital materials actually used in the product that are verified in the verification step.

Furthermore, a system for realizing the method invention is provided. More specifically, a digital material management system according to the present invention comprises a verification device that automatically verifies, in manufacturing of a product in which digital materials are used, digital materials that should be used and digital materials that are actually used in the product.

Preferably, the digital material management system according to the present invention comprises: a selection device that selects the digital materials that should be used from the plurality of digital materials; a registration device that registers in advance the digital materials selected by the selection device; and a display device that displays the verification result by the verification device.

The verification device and the display device may be integrally formed, and a digital material management apparatus may comprise functions of the verification device and the display device. In the digital display management apparatus, an apparatus including the verification device and an apparatus (monitor apparatus) including the display device may be connected by a cable, etc.

To achieve the object, the present invention provides a workflow management system comprising: a server apparatus; and a terminal device connected to the server apparatus through a network, wherein the terminal device comprises a verification device that automatically verifies, in manufacturing of a product in which digital materials are used, digital materials that should be used and digital materials that are actually used in the product.

Examples of the network include a public line network, such as the Internet, and a line system such as a local LAN. The signal transmission system may be a wired system or a wireless system.

The workflow management system according to an aspect of the present invention further comprises a printing apparatus that is connected to the terminal device and that performs printing in accordance with an instruction fed from the terminal device.

The print apparatus includes an offset printer (versions are created based on a draft for printing, and printing is performed using the versions) and a digital printer (on-demand printer that performs printing based on print data without versions).

According to the present invention, the use of entire digital materials can be automatically checked. The efficiency is improved, and the power can be saved.

BRIEF DESCRIPTION OF THE DRAWINGS

FIG. 1 is a diagram showing a verification result of a digital material management system according to an embodiment of the present invention;

FIG. 7 is a diagram showing a function distribution of server apparatuses;

FIG. 9 is a diagram showing a function distribution of the terminal devices;

FIG. 14 is a diagram showing a job list screen of the submission terminal device;

FIG. 15 is a diagram showing a job detail screen of the submission terminal device;

FIG. 19 is a diagram showing a job list screen of the submission terminal device;

FIG. 20 is a diagram showing a page list screen of the submission terminal device;

FIG. 22 is a diagram showing a page list screen of the submission terminal device;

FIG. 23 is a diagram showing a login screen of a proofreading terminal device;

FIG. 24 is a diagram showing a job list screen of the proofreading terminal device;

FIG. 25 is a diagram showing a page list screen of the proofreading terminal device;

FIG. 27 is a diagram showing a page list screen of the proofreading terminal device;

FIG. 28 is a diagram showing a job list screen of the proofreading terminal device;

FIG. 29 is a diagram showing a page list screen of the proofreading terminal device;

FIG. 33 is a diagram showing a page list screen of the proofreading terminal device;

FIG. 34 is a diagram showing a job list screen of a job creation/management terminal device;

FIG. 35 is a diagram showing an example of page-by-page version management; and

FIG. 36 is a diagram showing version management of printed materials in which versions of the pages are combined.

DETAILED DESCRIPTION OF THE PREFERRED EMBODIMENT

Figure 2:
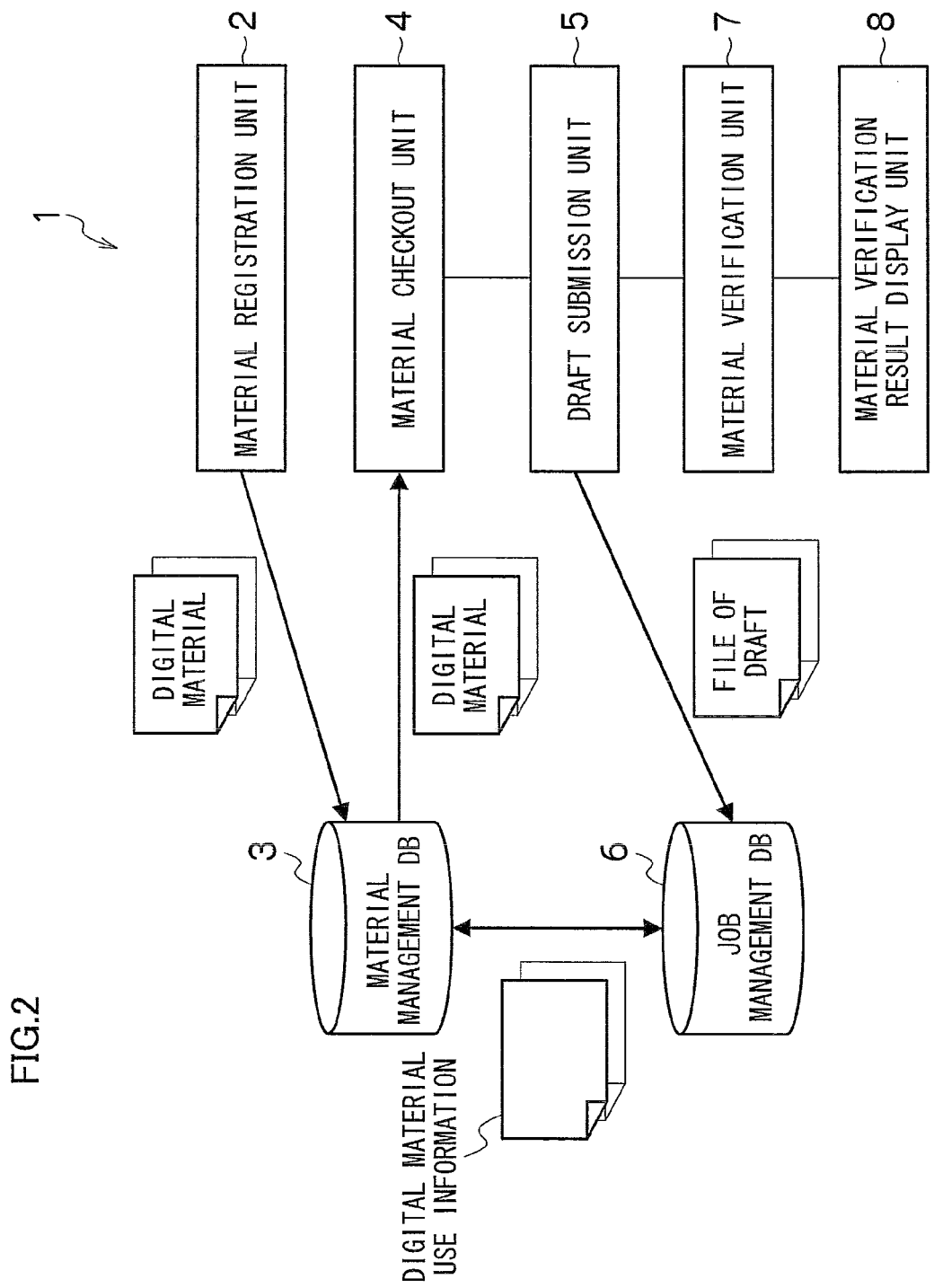
FIG. 2 is a block diagram showing an overall configuration of the digital material management system according to the embodiment of the present invention.

A preferred embodiment of the present invention will now be described in detail with reference to the appended drawings.

(Summary of Digital Material Management System)

A digital material management system illustrated in the embodiment automatically detects, in manufacturing of a printed material in which a multiplicity of digital materials, such as an advertisement and a catalog, are used, whether all digital materials prepared for use in the printed material are arranged and used in the printed material.

More specifically, after the material layout by automatic version composition or manual edit, specifications of digital materials (digital materials registered in advance and stored in a predetermined memory) selected from a multiplicity of digital materials and data of a draft for printing (digital materials used in a draft for printing) are automatically verified, and the verification result is displayed on a monitor in a list format. For example, file names of objects, such as used images and texts attached to the images, are extracted from a draft for printing, and data (file name list) describing file names of digital materials and the file names of the extracted images, etc., are verified to create a list of the verification result as shown in FIG. 1.

FIG. 1 is a diagram showing a list of the verification result displayed on a monitor not shown. FIG. 1 illustrates, for printed materials 1 to 3, a verification result list displaying whether item images are used and whether item information (auxiliary information of images) is used.

For the printed materials such as advertisements and catalogs, "ITEM IMAGE" as well as a set of "ITEM NAME", "ITEM NUMBER", "PRICE", etc., of the item indicated by the image are used. Therefore, the collective display of the information can prevent unused digital materials and erroneous use of other digital materials.

The verification result list shown in FIG. 1 displays images 1 to 3 as item images (thumbnail images) as well as item names 1 to 3, item numbers 1 to 3, and prices 1 to 3 of items indicated by the images 1 to 3 as item information, respectively. Whether the item images 1 to 3 are used and whether the item names 1 to 3, the item numbers to 3, and the prices 1 to 3 as item information are used are displayed for the printed materials 1 to 3.

With reference to the verification result list of FIG. 1, in the printed material 1, it can be recognized that "IMAGE 1" as well as "ITEM NAME 1", "ITEM NUMBER 1", and "PRICE 1" are used, "IMAGE 2" as well as "ITEM NAME 2", "ITEM NUMBER 2", and "PRICE 2" are unused, "IMAGE 3" is used, and "ITEM NAME 3", "ITEM NUMBER 3", and "PRICE 3" are not used.

For example, if the written contents are changed store by store when advertisements of department stores or supermarkets are manufactured, assuming that the printed material 1 of FIG. 1 is an advertisement of a store A, the printed material 2 is an advertisement of a store B, and the printed material 3 is an advertisement of a store C, the differences between the advertisements can be recognized from the verification result list of FIG. 1 at a glance, assisting the creator of draft and the proofreading personnel.

The printed materials 1 to 3 of FIG. 1 can be set as pages when a catalog (catalog document) constituted by a plurality of pages is manufactured. In that case, if one screen cannot display all pages, a scroll system display or a display in a form that can enlarge or reduce the screens can be applied.

According to the digital material management system configured this way, whether all digital materials that should be used are arranged and used in the printed material can be automatically checked. Therefore, the use of entire digital materials that should be used can be automatically checked. The efficiency is improved, and the power can be saved.

The digital material management system illustrated in the example can also be applied to manufacture web contents, such as websites, that can be browsed by a web browser function. For example, digital materials to be used are registered from a database storing digital materials such as an image file, and matching or mismatching of the file described in a source code and the metadata embedded in the file name of the digital material or the material file registered in advance in the database is displayed in a list format as shown in FIG. 1.

FIG. 2 illustrates a schematic configuration of a digital material management system 1 described above. As shown in FIG. 2, the digital material management system 1 illustrated in the example comprises: a material registration unit 2 that registers data of digital materials that should be used for a printed material to be manufactured, etc.; a material management database (digital material storage device) 3 that stores digital material data registered by the material registration unit 2; a material checkout unit 4 that reads out digital materials to be used from the material management database 3 when a file of draft of the printed material to be manufactured is created; a draft submission unit 5 that submits the file of draft; a job management database 6 that exchanges use information of the digital materials with the material management database 3 as the file of draft is submitted; a material verification unit 7 that verifies the registered digital materials and the used digital materials; and a material verification result display unit (display apparatus, monitor apparatus) 8 that displays the verification result of the digital materials.

The digital material management system 1 shown in FIG. 2 verifies whether the digital materials used in the draft are digital materials that should be used when the draft is submitted and verifies whether all digital materials that should be used are used. As the digital materials to be used are checked out, the digital materials are assumed to be selected.

The checkout is a process of registering the information of the printed material, in which the digital materials are used, in the material management database 3 when the digital materials to be used are acquired from the digital materials registered in the material management database 3.

The material management database 3 of FIG. 2 may be connected to a terminal device (computer) including the material registration unit 2, the material verification unit 7, etc., through a network or may be included in the terminal device. Another terminal device connected to the material management database 3 through a network may create the draft for printing, and the draft for printing may be acquired from the another terminal device through a network and an external interface.

The same effects as in the system and the method can be obtained by constituting a digital material management program for realizing the functions of the components and executing the digital material management program by a computer, etc. It is also possible to obtain the effects by using a recording medium in which computer readable code of the program is stored.

Figure 3:
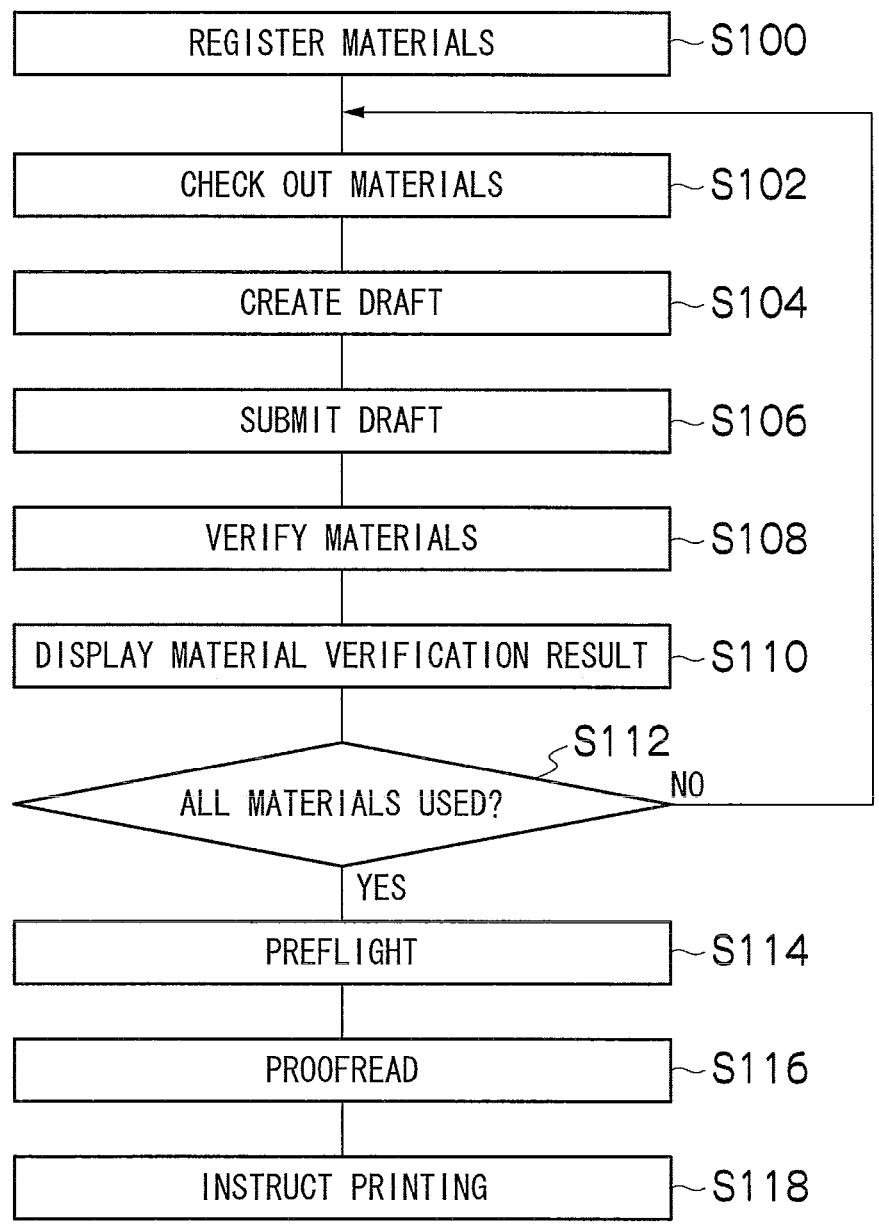
FIG. 3 is a flow chart showing a control flow of a digital material management method according to the embodiment of the present invention.

FIG. 3 is a flow chart showing a control flow of a digital material management method applied to the digital material management system. As described, the digital material management method may be constituted as a program or a recording medium in which computer readable code of the program is stored.

The digital material management method shown in FIG. 3 includes a material registration step of registering in advance digital materials (step S100) and a checkout step of selecting digital materials to be used from the registered digital materials (S102). The selected digital materials are used to create a draft (step S104), and when the draft is submitted (step S106), whether the digital materials used in the draft are registered is verified (step S108).

The verification result is displayed on a display apparatus such as a monitor (step S110), and the verification result can be checked. Whether all digital materials are used is further determined (step S112). If not all digital materials are used (NO determination), the process returns to S102, and the unused digital materials are selected.

On the other hand, if it is determined in step S112 that all digital materials are used (YES determination), after a preflight step (S114) and a proofreading step (step S116), a print instruction of the printed material is issued (step S118). Details of the preflight step shown in FIG. 3 will be described later.

(Application)

An embodiment in which the digital material management system and the digital material management method according to the present invention are applied to a workflow management system (print assist system) will now be described.

Figure 4:
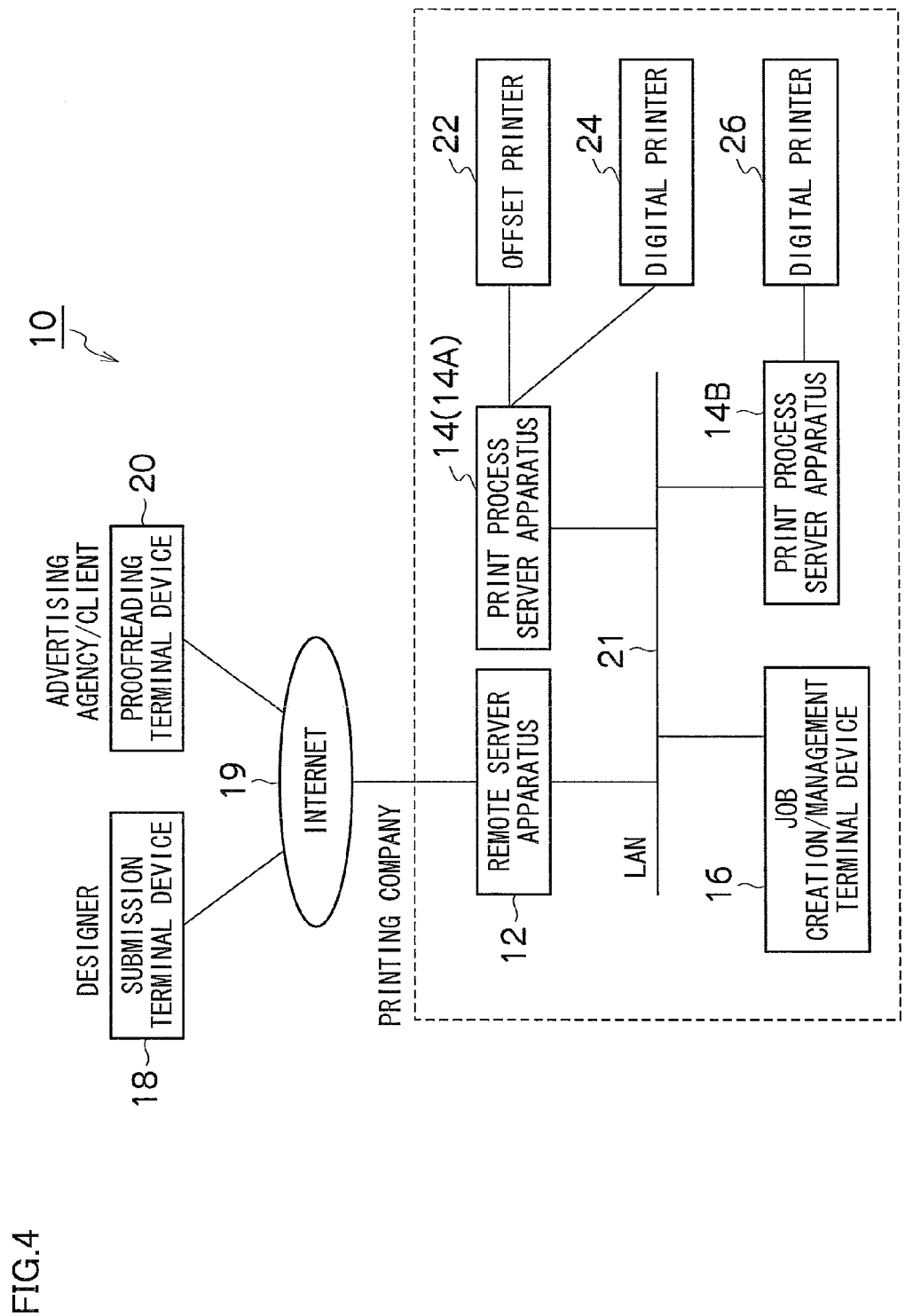
FIG. 4 is a diagram showing an overall configuration of a workflow management system applied with the digital material management system shown in FIG. 2.

FIG. 4 is a diagram showing an overall configuration of the workflow management system according to the application. The digital material management system is realized as a function of a terminal device (for example, proofreading terminal device 20 of FIG. 4) included in the workflow management system described below.

<Overall Configuration of Workflow Management System>

A workflow management system 10 shown in FIG. 4 is mainly constituted by a remote server apparatus 12, a plurality of print process server apparatuses 14 (14A and 14B), a job creation/management terminal device 16, a submission terminal device 18, and a proofreading terminal device 20. For example, the remote server apparatus 12, the print process server apparatus 14, and the job creation/management terminal device 16 are arranged in a printing company, the submission terminal device 18 is arranged in an office that the designer belongs to, and the proofreading terminal device 20 is arranged in an advertising agency or a client (company). However, it is obvious that the arrangement is not limited to this example.

The remote server apparatus 12 is a main apparatus of the workflow management system according to the application and is connected to the submission terminal device 18 and the proofreading terminal device 20 through the Internet 19 and connected to the print process server apparatuses 14A, 14B, and the job creation/management terminal device 16 through a LAN (or WAN) 21.

The print process server apparatuses 14A and 14B are associated with one or a plurality of printers. In the example shown in FIG. 4, the print process server apparatus 14A is associated with an offset printer 22 and a digital printer 24, and the print process server apparatus 14B is associated with a digital printer 26. When a print job is registered in the print process server apparatuses 14A and 14B, associated printers implement print operations online or offline. The digital printers 24 and 26 and the print process server apparatuses 14A and 14B are connected online, respectively.

Functions of the server apparatuses will now be described with reference to FIGS. 5 to 7.

Figure 5:
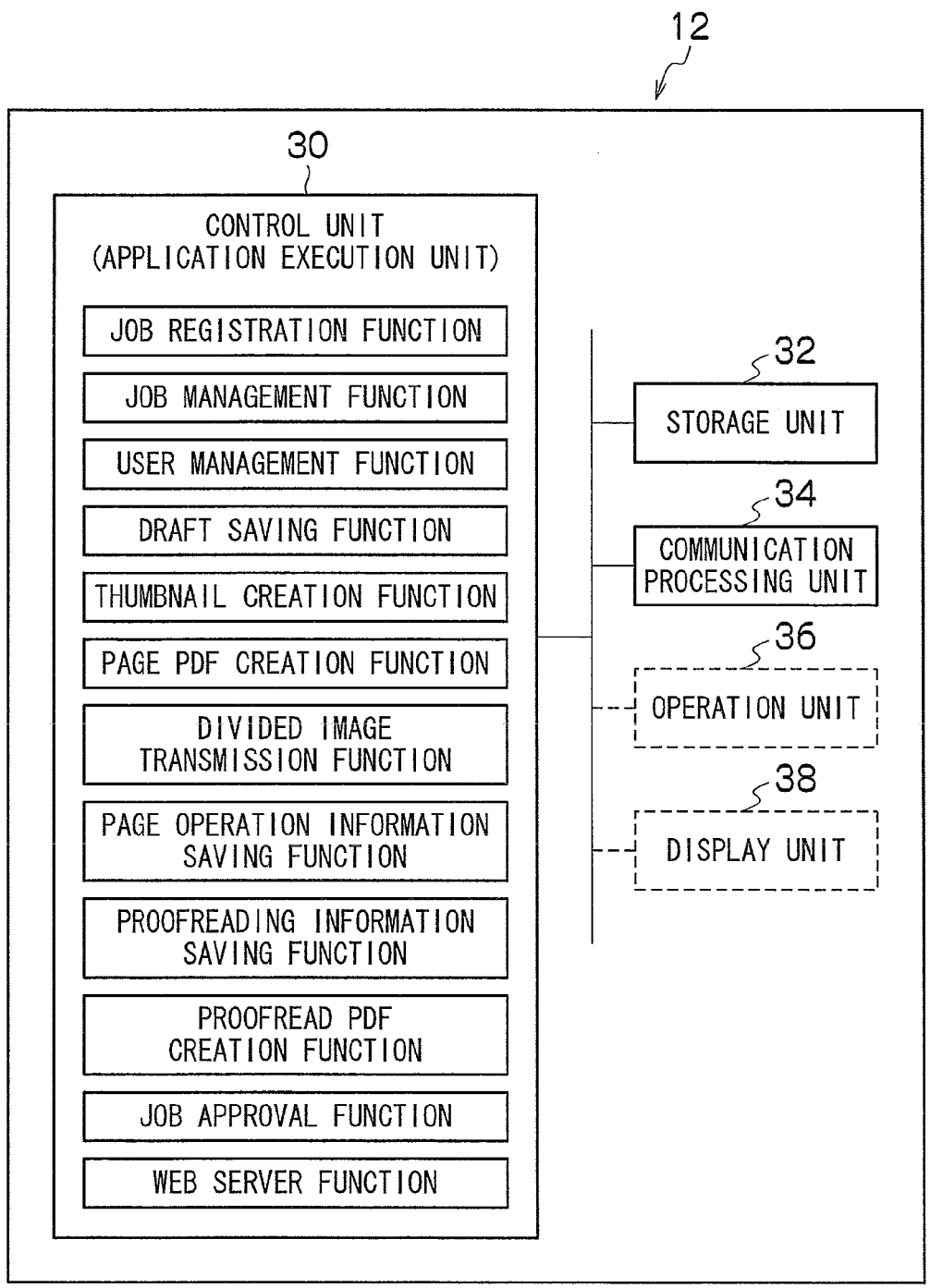
FIG. 5 is a block diagram showing a configuration of a remote server apparatus.

FIG. 5 is a block diagram showing a configuration of the remote server apparatus 12 shown in FIG. 4. As shown in FIG. 5, the remote server apparatus 12 is mainly constituted by a control unit 30, a storage unit 32, and a communication processing unit 34. The remote server apparatus 12 is actually realized by incorporating dedicated software into a computer that functions as a web server or a database server.

The control unit 30 is equivalent to a CPU and is an application execution unit that executes applications (programs) stored in the storage unit 32. The control unit 30 realizes a job registration function, a job management function, a user management function, a draft saving function, and various other functions.

The storage unit 32, equivalent to an external storage device (such as a hard disk) or a temporary storage device (such as a RAM), stores applications executed by the control unit 30 and a variety of data information such as PDF documents submitted from the submission terminal device 18.

The communication processing unit 34 is an interface unit that executes communication processing with the submission terminal device 18 and the proofreading terminal device 20 through the Internet 19 and is an interface unit that executes communication processing with the print process server apparatus 14 and the job creation/management terminal device 16 through the LAN 21.

In the example, as described later, the job creation/management terminal device 16 comprises a server management function, and the job creation/management terminal device 16 performs various settings and management of the remote server apparatus 12. An operation unit 36 and a display unit 38 may be arranged on the remote server apparatus 12, and the remote server apparatus 12 may directly perform various settings and management.

Figure 6:
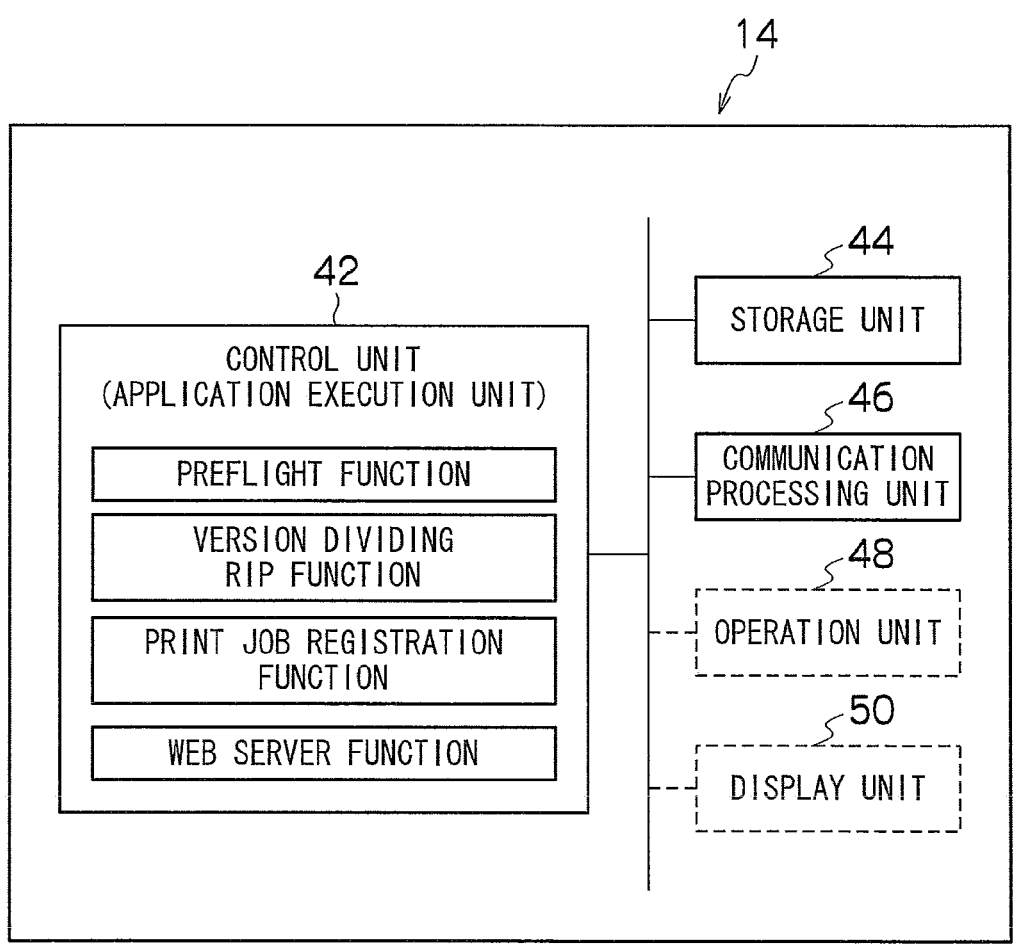
FIG. 6 is a block diagram showing a configuration of a print process server apparatus.

FIG. 6 is a block diagram showing a configuration of the print process server apparatus 14 shown in FIG. 4. As shown in FIG. 6, the print process server apparatus 14 is configured in the same way as the remote server apparatus 12 and is mainly constituted by a control unit 42, a storage unit 44, and a communication processing unit 46. The print process server apparatus 14 is actually realized by incorporating dedicated software into a computer that functions as a web server or a database server.

The control unit 42 is equivalent to a CPU and is an application unit that executes applications (programs) stored in the storage unit 44. The control unit 42 realizes a preflight function, a version dividing RIP function, and various other functions.

The storage unit 44, equivalent to an external storage device (such as a hard disk) or a temporary storage device (such as a RAM), stores (or temporarily stores) applications executed by the control unit 42 and a variety of data information such as PDF documents transmitted from the remote server apparatus 12.

The communication processing unit 46 is an interface unit that performs communication processing with the print process server apparatus 14 and the job creation/management terminal device 16 through a LAN and is an interface unit that performs communication processing with a printer arranged in association with the print process server apparatus 14.

In the example, as with the remote server apparatus 12, the job creation/management terminal device 16 performs various settings and management of the print process server apparatus 14. However, an operation unit 48 and a display unit 50 may be arranged on the print process server apparatus 14, and the print process server apparatus 14 may directly perform various settings and management.

FIG. 7 is a diagram showing a function distribution of the server apparatuses 12 and 14.

As shown in FIG. 7, the server apparatuses 12 and 14 have a web server function. For example, when the terminal devices 16, 18, and 20 log in the remote server apparatus 12, the web server function provides login screens on the terminal devices.

The remote server apparatus 12 has a function of registering a job (job registration function) and a function of managing the progress of the job registered by the job registration function (job management function). As described, the job, constituted by one or a plurality of operations (tasks), indicates a series of steps of the production of a printed material. The job created by the terminal device having the job creation function (job creation/management terminal device 16) is saved in the storage unit 32 of the remote server apparatus 12.

The remote server apparatus 12 also has a function (user management function) of setting and managing the access right of the personnel (such as designer, advertising agency, client, and printing company) who cooperate in producing the printed material job by job. The personnel who operate the terminal devices 16, 18, and 20 can perform operations within the range of the access right set by the user management function.

The remote server apparatus 12 further has a function (draft saving function) of saving a PDF document submitted from submission personnel (for example, designer), functions (thumbnail creation function and page PDF creation function) of creating thumbnails and page PDF for displaying page thumbnails (reduced pages) for the terminal device to operate the pages after the print process server apparatus 14 performs preflight and version dividing RIP as described below, a function (page operation information saving function) of saving history information of the page operations on the terminal device, and various other functions (divided image transmission function, proofreading information saving function, proofreading PDF creation function, and job approval function). The draft (PDF document) submitted from the terminal device having a draft transmission function (submission terminal device 18), the proofreading history of proofreading by the terminal device having a proofreading function (proofreading terminal device 20), etc., are saved in the storage unit 32 of the remote server apparatus 12.

The print process server apparatus 14 has a function (preflight function) of executing a preflight process for determining whether the PDF document submitted to the remote server apparatus 12 is data suitable for printing (for example, whether the designated font is a font that can be used in the system) and a function (version dividing RIP function) of converting (raster conversion) images of R (red), G (green), and B (blue) included in the PDF document into a bitmap in which the image is divided into images of C (cyan), M (magenta), Y (yellow), and K (black) suitable for printing. The print process server apparatus 14 also has a function (print job registration function) of registering a print job to an associated printer.

Although an example has been illustrated in which the functions shown in FIG. 7 are distributed to two server apparatuses (remote server apparatus 12 and print process server apparatus 14), the arrangement is not limited to this. One server apparatus may realize all functions, and the functions may be distributed to three or more server apparatuses.

Functions of the terminal devices will now be described with reference to FIGS. 8 and 9.

Figure 8:
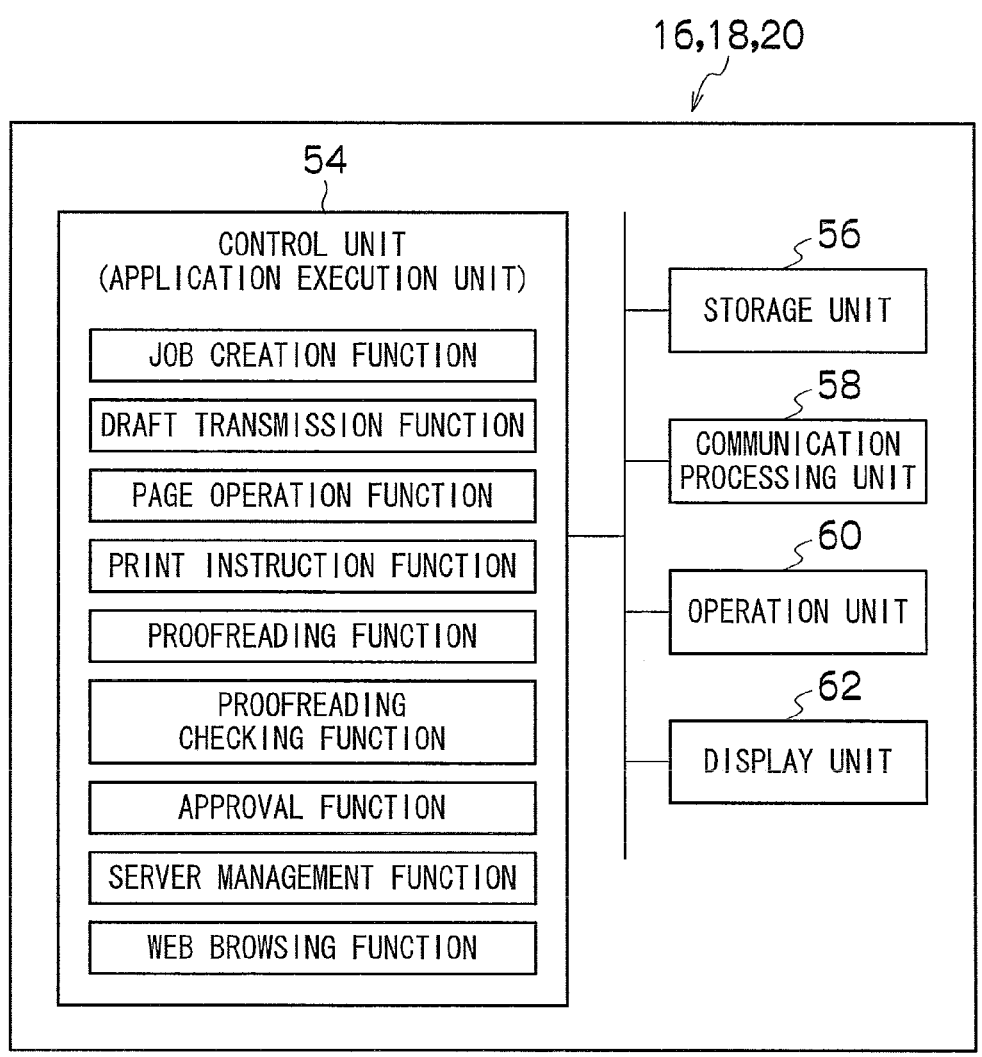
FIG. 8 is a block diagram showing a configuration of terminal devices.

FIG. 8 is a block diagram showing a configuration of the terminal devices 16, 18, and 20 shown in FIG. 4. For the convenience of explanation, FIG. 8 displays entire functions distributed to the terminal devices 16, 18, and 20.

As shown in FIG. 8, the terminal devices 16, 18, and 20 are mainly constituted by a control unit 54, a storage unit 56, a communication processing unit 58, an operation unit 60, and a display unit 62. The terminal devices 16, 18, and 20 are actually realized by a universal personal computer including web browser software. The digital material management system (method) described with reference to FIGS. 1 to 3 can be applied as a function of the proofreading terminal device 20.

The control unit 54 is equivalent to a CPU and is an application execution unit that executes applications (programs) stored in the storage unit 56. The control unit 54 realizes a job creation function, a draft transmission function, a page operation function, a digital material management function (digital material verification function), and various other functions.

The storage unit 56, equivalent to an external storage device (such as a hard disk) or a temporary storage device (such as a RAM), saves applications executed by the control unit 54, PDF documents to be transmitted to the remote server apparatus 12, etc. As described below, the storage unit 56 saves thumbnail PDF, etc., transmitted from the remote server apparatus 12. Furthermore, the material management database (reference numeral 3 of FIG. 2) is stored.

The applications (terminal programs) saved in the storage unit 56 are, for example, programs described in a language of Java (registered trademark). The web browsing function of the terminal devices 16, 18, and 20 is used to log in the remote server apparatus 12, and the terminal programs are downloaded (installed) from the remote server apparatus 12 to the terminal devices through the Internet 19. An external storage medium may be used to directly install the terminal programs on the terminal devices, not through the Internet 19.

Different terminal programs may be used depending on the usage of the terminal, or common programs may be used in all terminal devices. In the former case, the version upgrading operation of the programs can be limited within the minimum range, and the convenience of the user improves. In the latter case, it is preferable that whether to use the functions can be selected in accordance with the user information managed by the remote server apparatus 12, and sharing of the terminal programs can reduce the cost.

The communication processing unit 58 is an interface unit that performs communication processing with the remote server apparatus 12 through the Internet 19 and the LAN 21.

The operation unit 60, equivalent to a keyboard, a mouse, etc., functions as an operation device of various file operations, command operations, etc., on a display screen of the display unit 62 described below.

The display unit 62, equivalent to a monitor, functions as a device that displays various screens (GUI) provided by applications stored in the storage unit 56. The display unit 62 also functions as a material verification result display unit 8 illustrated in FIG. 2.

FIG. 9 is a diagram showing a function distribution of the terminal devices 16, 18, and 20.

As shown in FIG. 9, the terminal devices 16, 18, and 20 have a function of browsing web pages disclosed by the remote server apparatus 12, and inputting a login ID and a password on a login screen provided from the remote server apparatus 12 allows various operations within the access right set by the remote server apparatus 12.

The submission terminal device 18 has a function (draft transmission function) of transmitting a PDF document to the remote server apparatus 12, a function (page operation function) of operating pages of documents saved in the remote server apparatus 12, and a function (proofreading checking function) of checking the result of proofreading by proofreading personnel (advertising agency or client).

The proofreading terminal device 20 has a function (proofreading function) of proofreading a PDF document submitted to the remote server apparatus 12 and a function (approval function) of approving that the proofreading operation is completed (proofreading completion). The proofreading function includes a divided image synthesis function, a version inspection image creation function, a proofreading information generation function, and a digital material management function not shown.

The job creation/management terminal device 16 has a function (job creation function) of creating a job, a function (print instruction function) of issuing a print instruction to the print process server apparatus 14 through the remote server apparatus 12 after the approval process by the proofreading personnel (advertising agency or client), and a function (sever management function) of performing various settings and management of the server apparatuses 12 and 14. The job creation function includes a function of changing or canceling a job already registered in the remote server apparatus 12 and setting or changing the access right of the personnel (designer, advertising agency, client, and printing company) who cooperate in producing a printed material.

In the example, as shown in FIG. 9, the functions are distributed to the submission terminal device 18, the proofreading terminal device 20, and the job creation/management terminal device 16. However, the arrangement is not particularly limited to this, and the function distribution can be determined according to the usage of the terminal. For example, the functions of the submission terminal device 18 and the proofreading terminal device 20 may be realized by combining the functions into one terminal device (submission/proofreading terminal device). If the job creation personnel is personnel other than the printing company (for example, personnel of advertising agency), the functions of the job creation/management terminal device 16 may be divided into two terminal devices (job creation terminal device and management terminal device), and the job creation terminal device may be connected to the remote server apparatus 12 through the Internet 19.

<Description of Workflow>

An overall process (workflow) by the workflow management system 10 will now be described with reference to FIG. 10. In this example, it is assumed that job creation personnel (printing company) creates a job, draft creator/submission personnel (designer) submits a PDF document, proofreading personnel (advertising agency or client) performs proofreading, resubmission and proofreading are repeated until the proofreading operation is completed (proofreading completion), proofreading personnel (advertising agency or client) approves the draft, and then print instruction personnel (printing company) issues a print instruction.

[Draft Creation Step]

A client who has requested for a printed material or a material creation division (item photographing division) of a manufacture company creates digital materials. The created digital materials are registered in the registration step of digital material (step S100) described with reference to FIG. 3.

In the creation of a draft for printing, the registered digital materials are appropriately checked out (step S102). The checked out digital materials are assumed to be selected.

[Job Creation Step]

The job creation personnel (printing company) then logs in the remote server apparatus 12 from the job creation/management terminal device 16 and uses the job creation function of the job creation/management terminal device 16 to create a job related to the creation of the requested printed material (step S10). As described, a job, constituted by one or a plurality of operations (tasks), indicates a series of steps of the production of a printed material. At this point, personnel (designer, advertising agency, client, and printing company) who cooperate in the production of the printed material is also designated (access right is set). When the job creation/management terminal device 16 creates a job this way, the result is notified to the remote server apparatus 12, and the remote server apparatus 12 registers the job (step S12). At the same time, the access right of the personnel is set. Although not shown, when the remote server apparatus 12 registers the job, the registration of the job may be notified by e-mail, etc., to all (or part of) personnel related to the registered job.

[Submission Step]

Figure 11:
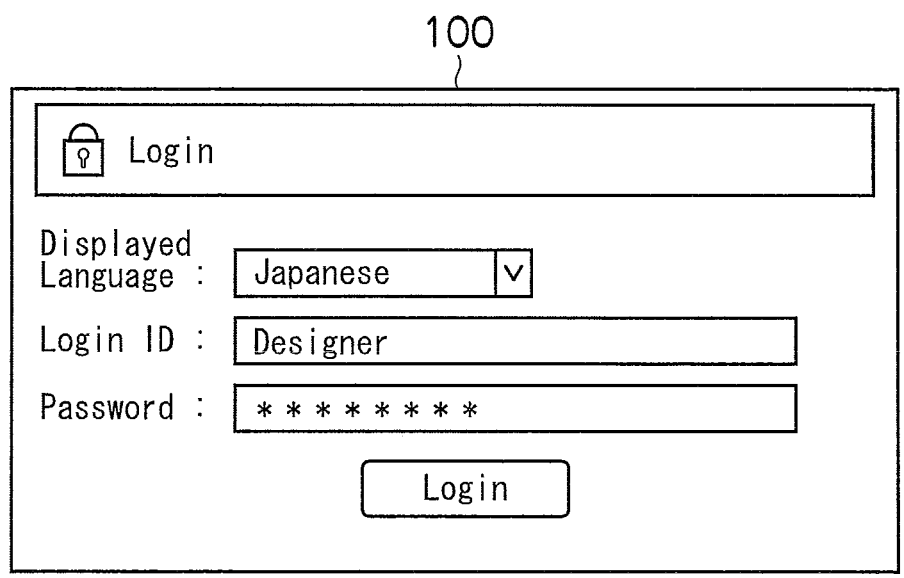
FIG. 11 is a diagram showing a login screen of a submission terminal device.
Figure 12:
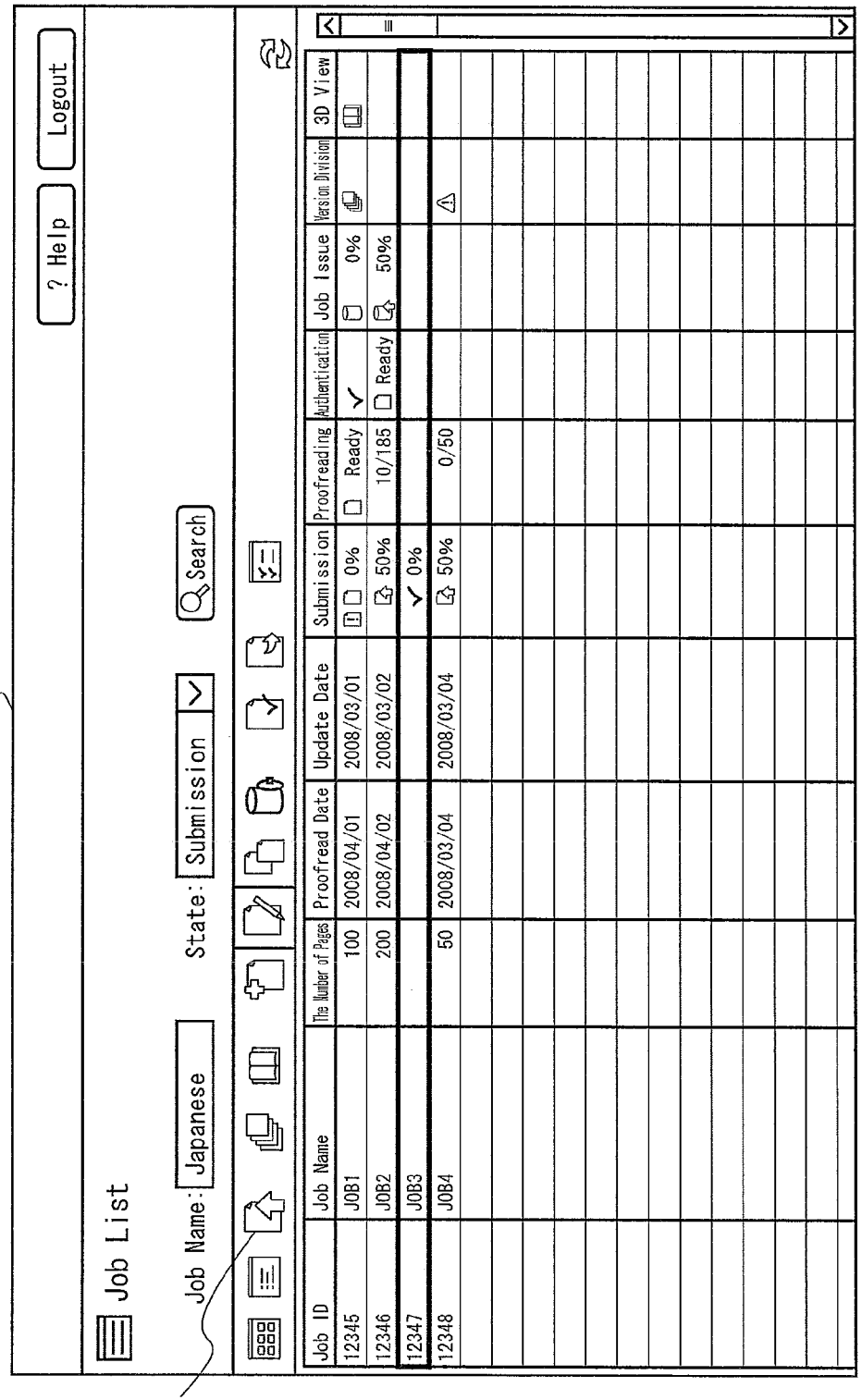
FIG. 12 is a diagram showing a job list screen of the submission terminal device.

When the creation of the draft (PDF document) of the printed material is completed, the submission personnel (designer) inputs the login ID and password of the submission personnel on a login screen 100 (FIG. 11) displayed on the display unit 62 of the submission terminal device 18 to log in the remote server apparatus 12. After the login, the submission terminal device 18 displays a job list screen 102A (FIG. 12), and the remote server apparatus 12 displays a list of registered jobs.

Figure 13:
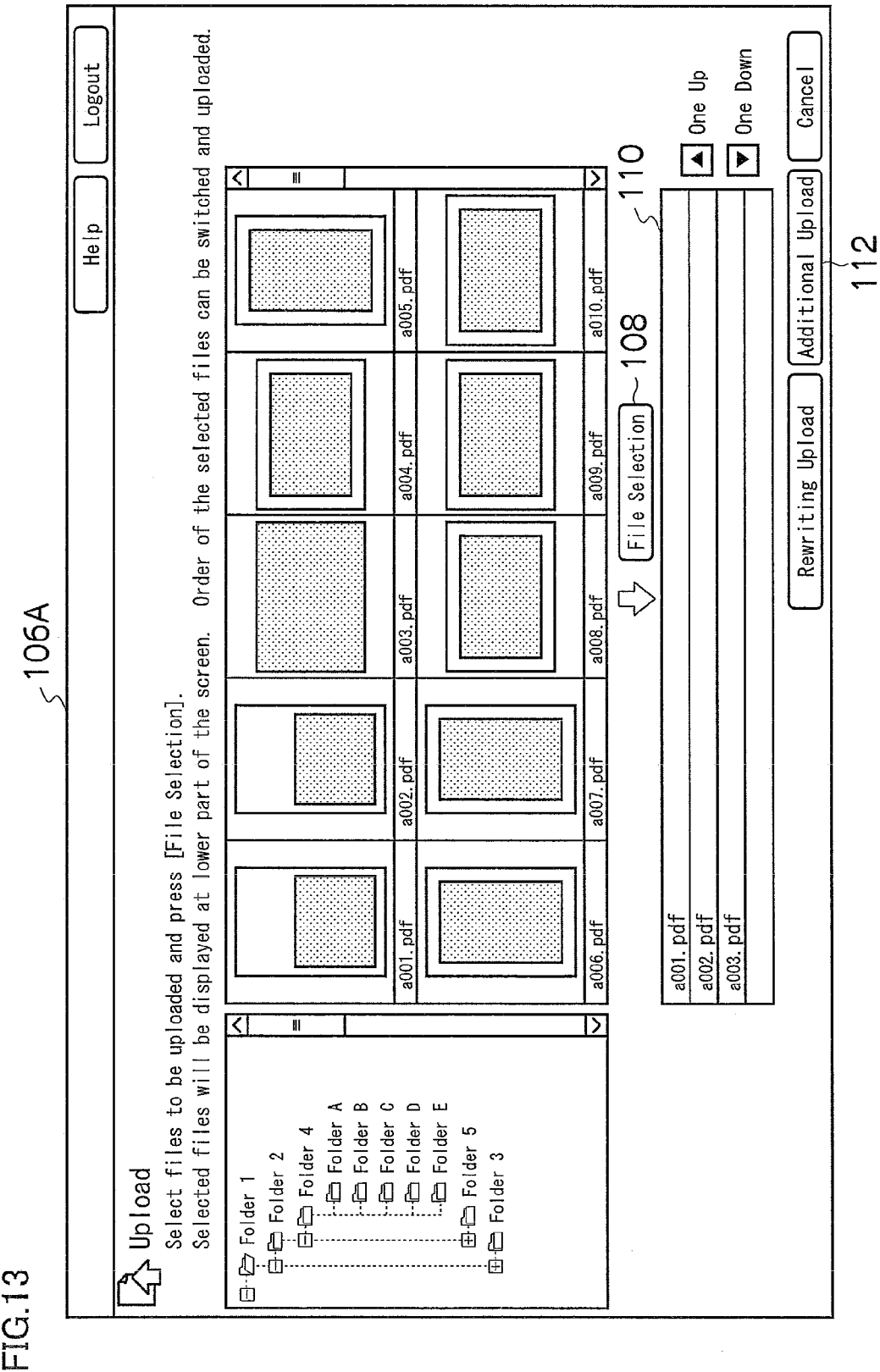
FIG. 13 is a diagram showing an upload screen of the submission terminal device.

It is preferable to display only the jobs in which the access right is allocated to the logged-in submission personnel. When the submission personnel operates the mouse of the operation unit 60 to select a PDF document job to be uploaded from the jobs displayed in the list and presses an upload button 104, the display unit 62 of the submission terminal device 18 displays an upload screen 106A (FIG. 13). When the submission personnel selects one or a plurality of files (PDF documents) to be transmitted to the remote server apparatus 12 from the file list displayed on the upload screen 106A and presses a file selection button 108, a transmission file list window 110 below displays the selected files.

In the example, the transmission file list window 110 displays three PDF documents (file names "a001.pdf", "a002.pdf", and "a003.pdf"). Each PDF document is constituted by one or a plurality of pages. Subsequently, when the submission personnel presses an additional upload button 112, the submission terminal device 18 starts uploading (transmitting) the PDF documents to the remote server apparatus 12 (step S14 of FIG. 10).

In this way, one or a plurality of PDF documents can be selected and uploaded (submitted) to the remote server apparatus 12 in the embodiment. Therefore, all files of draft (one or a plurality of PDF documents) can be collectively submitted, or part of the files of draft can be partially submitted. As a result, in the resubmission, only PDF documents including modified pages can be selected and partially submitted.

When the upload of the PDF documents is completed, the display unit 62 of the submission terminal device 18 displays a job list screen 102B (FIG. 14). It is assumed here that all files of draft (PDF documents) are collectively submitted in the first submission (i.e., submission rate 100%).

Figure 10:
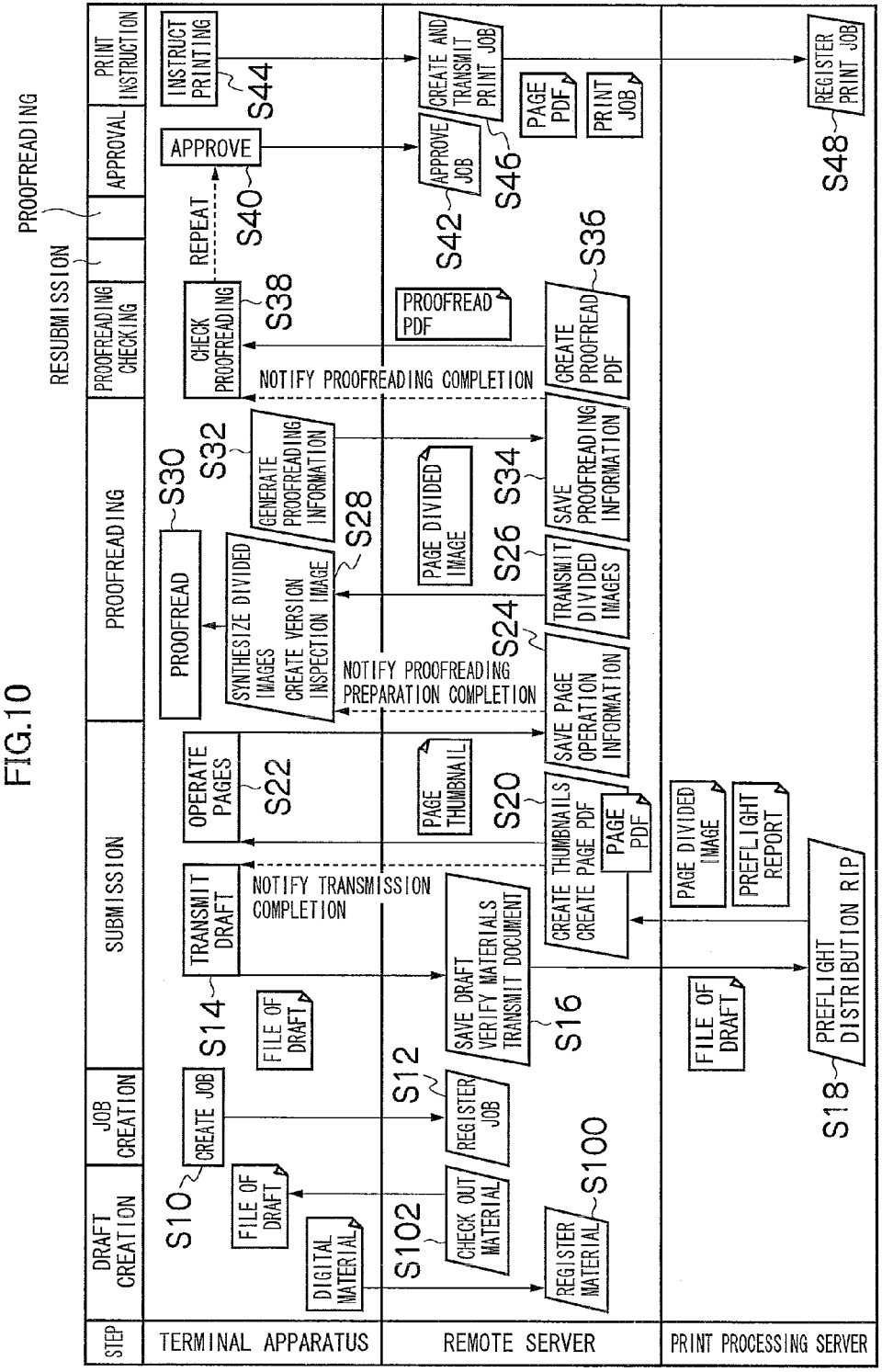
FIG. 10 is a diagram showing an overall process by the workflow management system.

The remote server apparatus 12 save the PDF documents uploaded from the submission terminal device 18 in the storage unit 32 and transmits the PDF documents to the print process server apparatus 14 (step S16 of FIG. 10).

The print process server apparatus 14 uses the preflight function and the version dividing RIP function to apply a preflight process and version dividing RIP to the PDF documents transmitted from the remote server apparatus 12 (step S18). As a result, whether the submitted PDF documents are data suitable for printing (for example, whether the designated font is a font usable in the system) is determined, and images of R (red), G (green), and B (blue) included in the PDF documents are converted (raster conversion) into bitmaps by dividing the images into images of C (cyan), M (magenta), Y (yellow), and K (black) suitable for printing. The print process server apparatus 14 notifies a report (preflight report) indicating the preflight result and transmits page divided images to the remote server apparatus 12.

After receiving the preflight report and the page divided images from the print process server apparatus 14, the remote server apparatus 12 notifies the transmission completion to the submission terminal device 18. At this point, the preflight report is also notified.

Based on the page divided images received from the print process server apparatus 14, the remote server apparatus 12 creates PDF of the pages (page PDF) of the PDF documents, saves the page PDF in the storage unit 32, creates thumbnails of the page PDF (page thumbnails), and transmits the page thumbnails to the submission terminal device 18 (step S20). The page thumbnails transmitted from the remote server apparatus 12 to the submission terminal device 18 are stored (or temporarily stored) in the storage unit 56 of the submission terminal device 18, and the list is displayed on a predetermined window of the display unit 62 of the submission terminal device 18 as described later.

Figure 16:
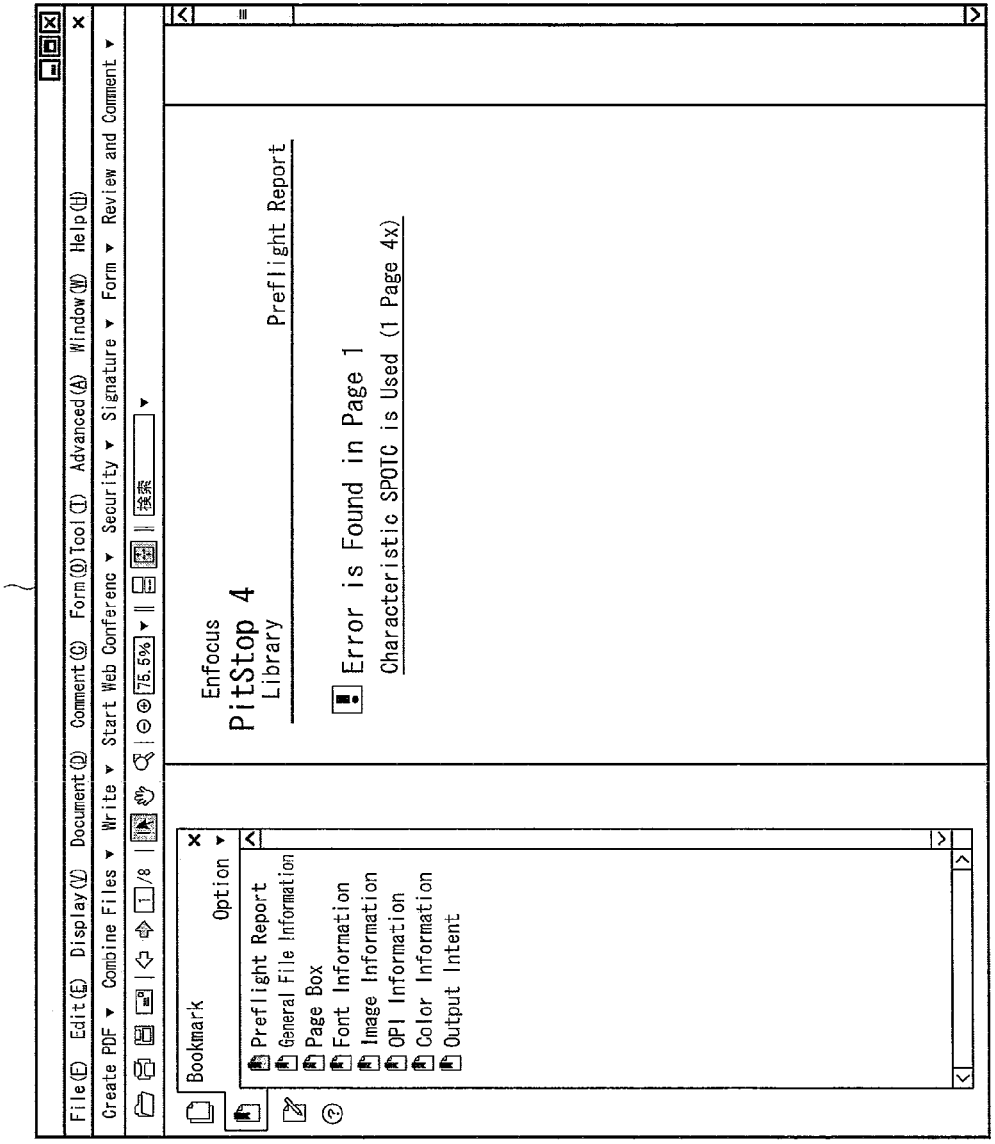
FIG. 16 is a diagram showing a preflight report screen of the submission terminal device.

In the submission terminal device 18, if there is an error or warning in the preflight report notified from the remote server apparatus 12, an error message 114 "There is a preflight error. Check from the job detail." is displayed above the job list screen 102B (FIG. 14). At this point, when the submission personnel operates the mouse of the operation unit 60 to press a job detail display button 116, a job detail screen 118 (FIG. 15) is displayed. In this example, the job detail screen 118 displays three errors and 10 warnings as a result of the preflight process to the submitted PDF documents. When a detail check button 120 of the job detail screen 118 is further pressed, a preflight report screen 122 (FIG. 16) is displayed, and the submission personnel can check more detailed error information.

Figure 17:
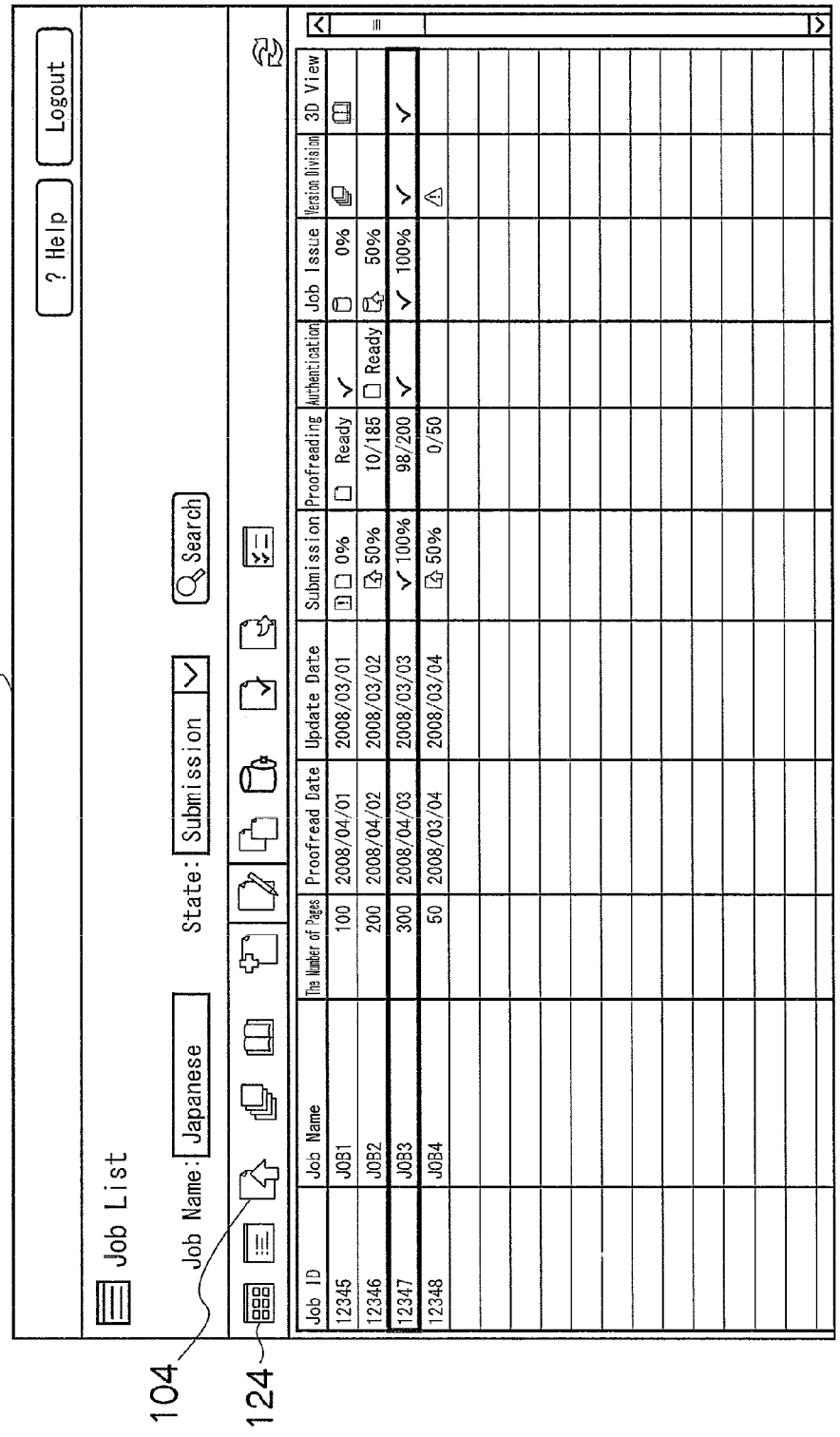
FIG. 17 is a diagram showing a job list screen of the submission terminal device.
Figure 18:
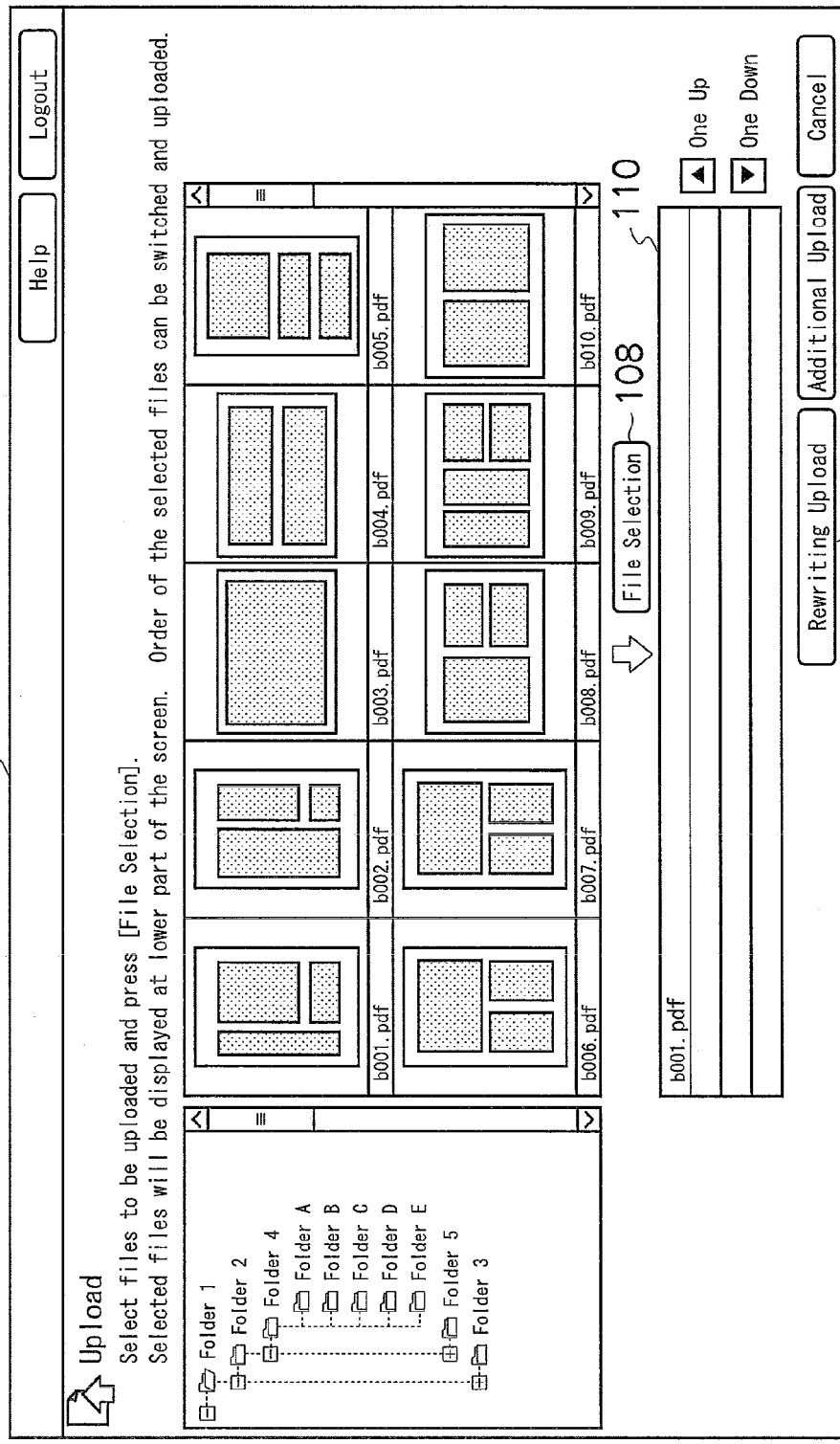
FIG. 18 is a diagram showing an upload screen of the submission terminal device.

After modifying the PDF documents, the submission personnel again logs in the remote server apparatus 12 from the submission terminal device 18, and the display unit 62 of the submission terminal device 18 displays a job list screen 102C (FIG. 17). When the submission personal operates the mouse of the operation unit 60 to select a PDF document job to be uploaded from the jobs displayed in the list and presses the upload button 104, the display unit 62 of the submission terminal device 18 displays an upload screen 106B (FIG. 18).

When PDF documents including only the modified pages (hereinafter "modified PDF document") are selected from the file list displayed on the upload screen 106B and the file selection button 108 is pressed, the lower transmission file list window 110 displays the selected file. In the example, a modified PDF document (file name "b001.pdf") is selected and displayed on the transmission file list window 110. Subsequently, when the submission personnel presses a rewriting upload button 126, the upload (transmission) of the modified PDF document from the submission terminal device 18 to the remote server apparatus 12 is started.

When the upload of the modified PDF document is completed, the print process server apparatus 14 applies the preflight process and the page dividing RIP to the modified PDF document as in the first submission. The display unit 62 of the submission terminal device 18 then displays a job list screen 102D (FIG. 19). It is assumed here that there is no error or warning in the modified PDF documents as a result of the preflight process (i.e., the error message 114 shown in FIG. 14 is not displayed in FIG. 19).

Figure 20:
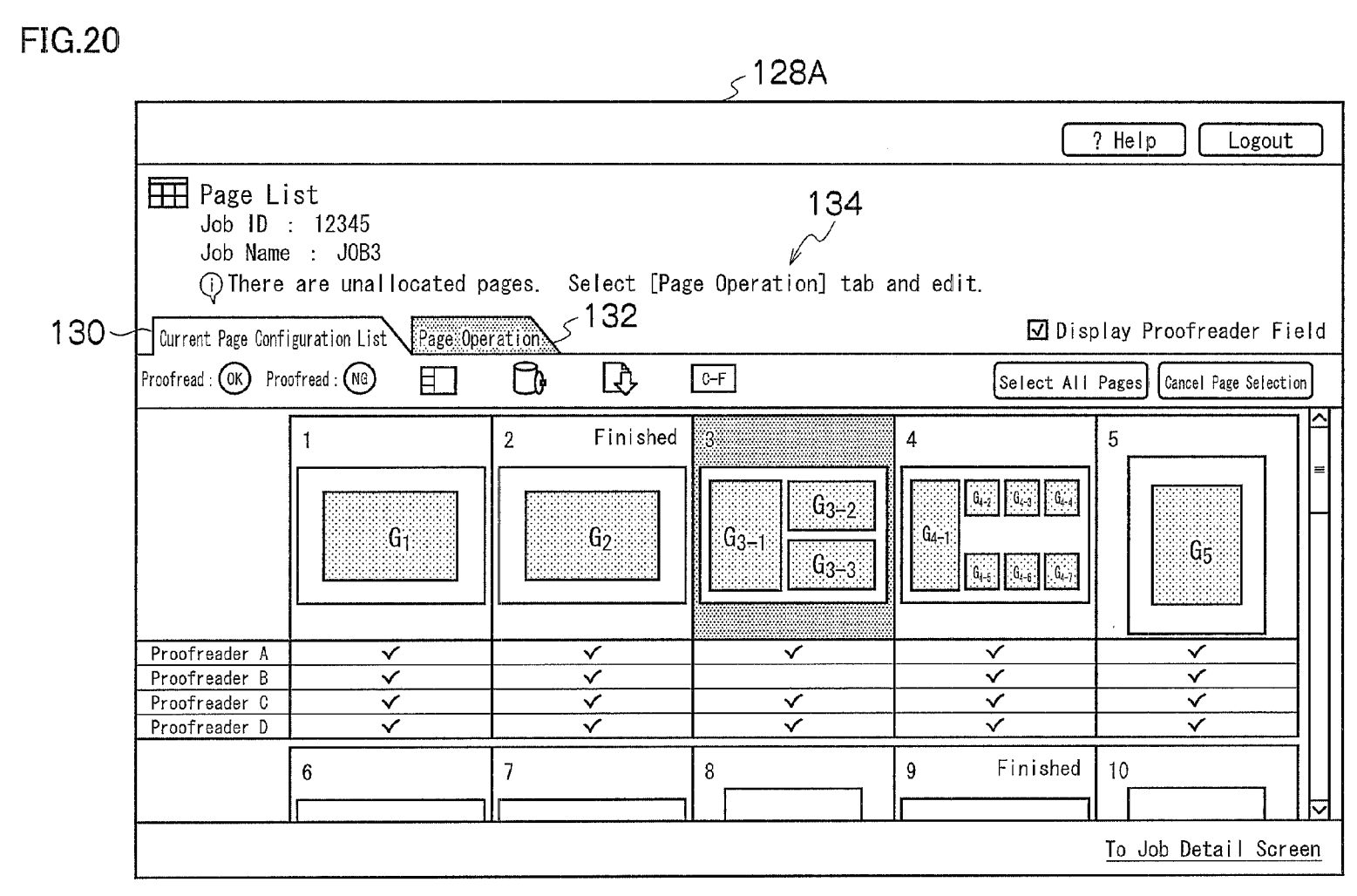

Subsequently, when the submission personnel operates the mouse of the operation unit 60 and presses a page list button 124 of the job list screen 102D, a page list screen 128A (FIG. 20) is displayed. The page list screen 128A includes a "Current Page Configuration List" tab 130 and a "Page Operation" tab 132, and FIG. 20 illustrates a state that the "Current Page Configuration List" tab 130 is opened. At this point, a warning message 134 "There are unallocated pages. Select [Page Operation] tab and edit." is displayed above the page list screen 128B. In the first submission, the pages of the submitted draft (PDF document) are automatically allocated to the pages of the printed material. On the other hand, in the resubmission, the pages (modified pages) of the submitted modified PDF document are not automatically allocated, and the warning message 134 as described above is displayed.

Figure 21:
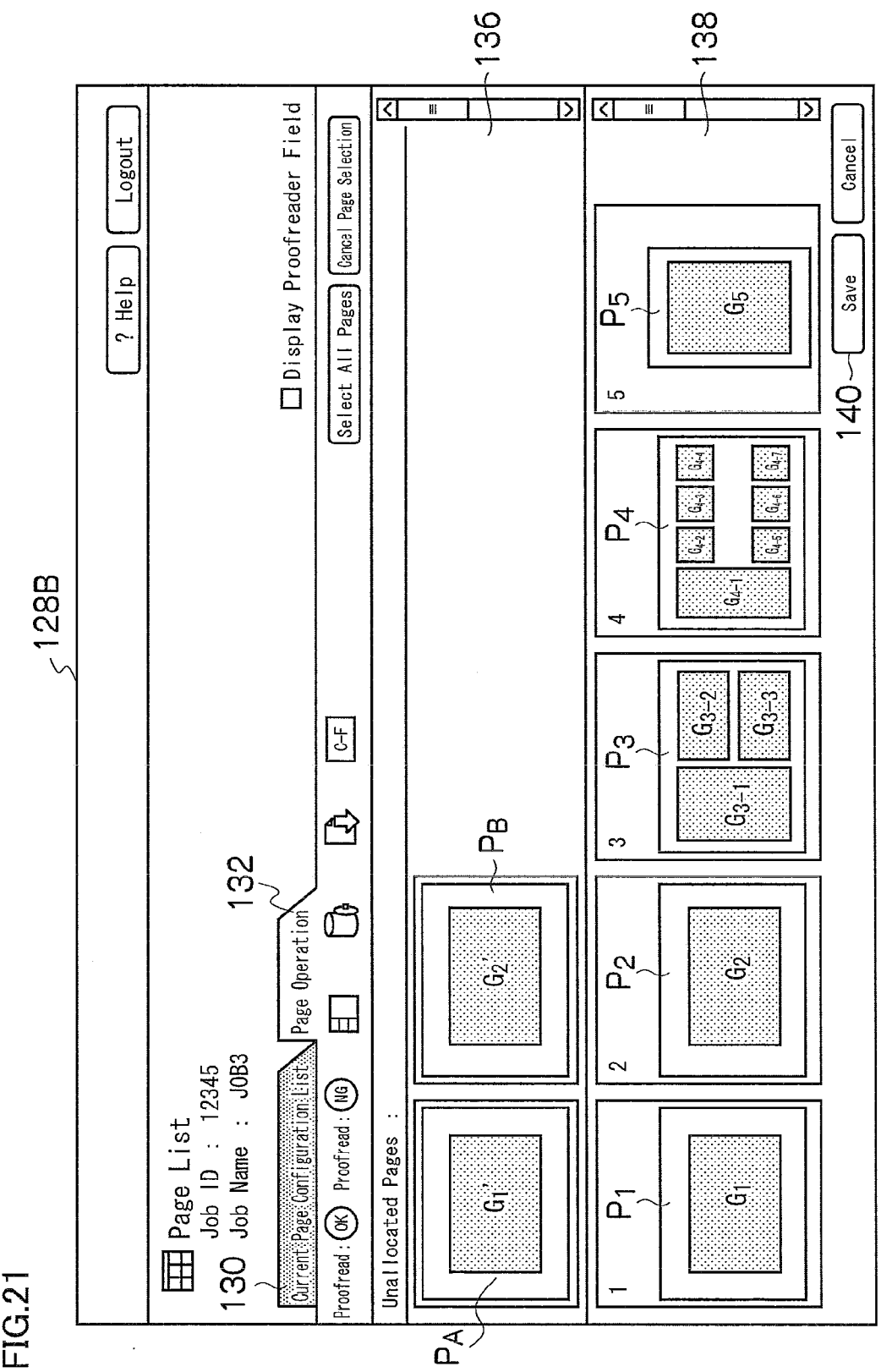
FIG. 21 is a diagram showing a page list screen of the submission terminal device.

Under the condition, when the submission personnel operates the mouse of the operation unit 60 to open the "Page Operation" tab 132, the screen switches to the page list screen 128B shown in FIG. 21, and the pages can be operated. At this point, a list of the pages of the resubmitted modified PDF documents is displayed on an "Unallocated Page List" window 136 above the page list screen 128B, and a list of the pages of the PDF documents in which the page allocation is already completed is displayed on a lower "Allocated Page List" window 138.

At this point, when the submission personnel operates the mouse of the operation unit 60 to, for example, drag a modified page $P_B$ displayed on the "Unallocated Page List" window 136 and moves and drops the modified page $P_B$ so that the modified page $P_B$ overlaps a page $P_2$ displayed on the "Allocated Page List" window 138, the modified page $P_B$ replaces the page $P_2$. When the submission personnel drags a modified page $P_B$ and moves and drops the modified page $P_B$ between adjacent pages $P_3$ and $P_4$ displayed on the "Allocated Page List" window 138, the modified page $P_B$ is inserted between the adjacent pages $P_3$ and $P_4$. The modified page $P_B$ allocated to the "Allocated Page List" window 138 is deleted from the "Unallocated Page List".

In this way, the pages displayed on the "Unallocated Page List" window 136 (pages of the resubmitted drafts) are replaced by pages displayed on the "Allocated Page List" window 138 or the pages are inserted between the pages displayed on the "Allocated Page List" window 138 to allocate the pages of the resubmitted drafts.

The mouse of the operation unit 60 can be operated to change the position of or delete the pages displayed on the "Allocated Page List" window 138, and the order of pages can be freely changed. Although not described, even during the first submission, the pages can be edited in the same way by opening the "Page Operation" tab 132 from the page list screen.

Figure 22:
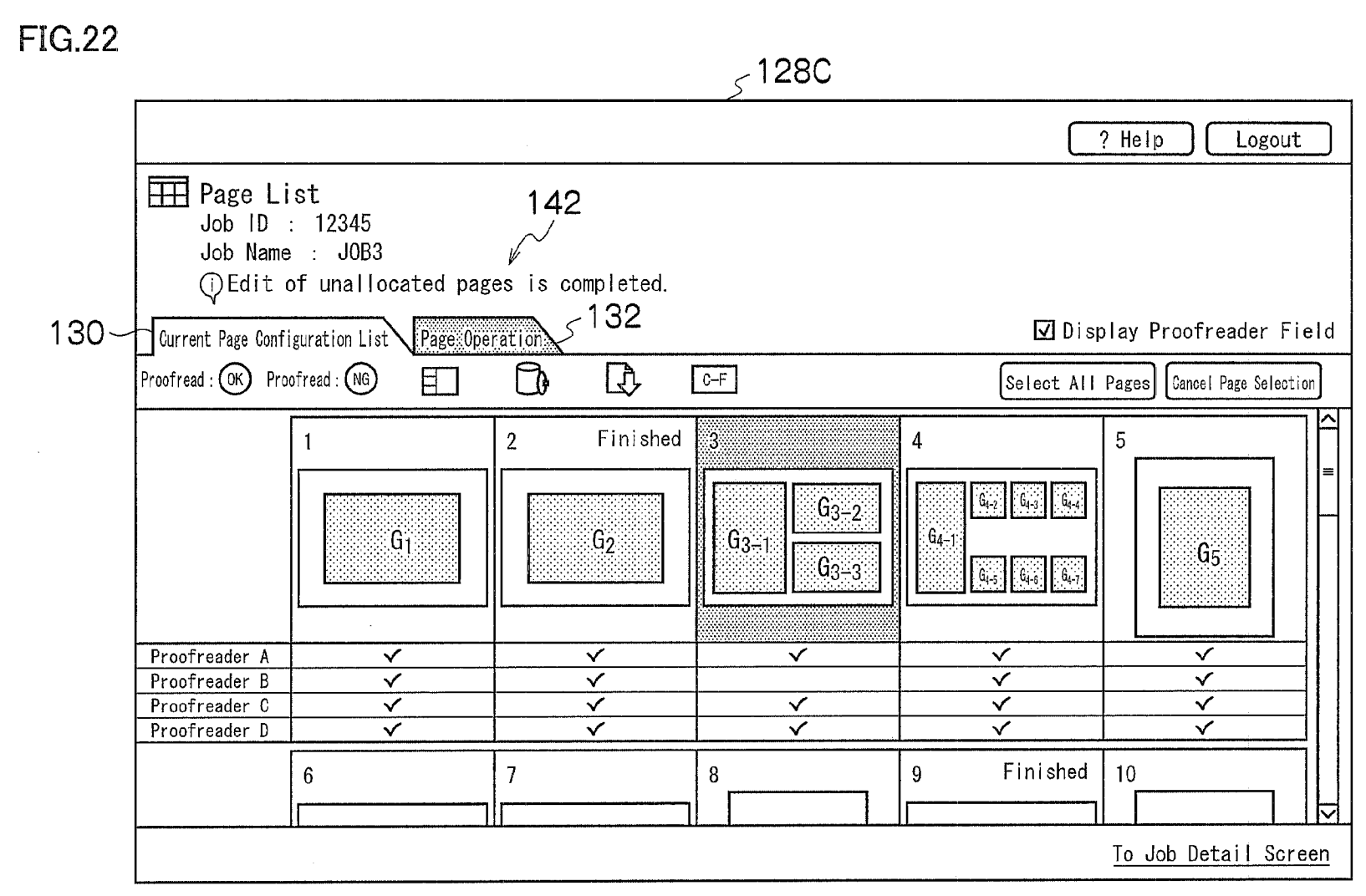

When the allocation of all pages displayed on the "Unallocated Page List" window 136 is completed and the submission personnel presses a save button 140, the remote server apparatus 12 saves the page operation information in the storage unit 44 and notifies the proofreading preparation completion to the proofreading terminal device 20. At this point, as shown in FIG. 22, a page list screen 128C switches to the "Current Page Configuration List" tab 130, and a message 142 "Edit of unallocated pages is completed." is displayed.

When the pages displayed on the "Allocated Page List" window 138 are replaced by the pages displayed on the "Unallocated Page List" window 136 (pages of resubmitted drafts), the old pages before the replacement are not completely deleted. The storage unit 32 of the remote server apparatus 12 stores the old pages, and the page history is managed by the page operation information saving function of the remote server apparatus 12. Therefore, the original state can be restored even after the replacement of the pages.

In this way, when the submission personnel uses the submission terminal device 18 to operate the pages (step S22 of FIG. 10) and the operation is completed, the remote server apparatus 12 saves the page operation information in the storage unit 44 and notifies the proofreading preparation completion to the proofreading terminal device 20 (step S24).

[Proofreading Step]

When the proofreading preparation completion notification is received from the remote server apparatus 12, the proofreading terminal device 20 enters a state in which the proofreading personnel (advertising agency or client) can perform proofreading. At this point, the remote server apparatus 12 transmits the page divided images to the proofreading terminal device 20 (step S26). The proofreading terminal device 20 stores (or temporarily stores) the page divided images received from the remote server apparatus 12 in the storage unit 32, and in accordance with the terminal operation of the proofreading personnel, combines the page divided images and creates version inspection images (step S28). Although not shown, in accordance with the terminal operation of the proofreading personnel, whether all digital materials registered as digital materials to be used are used is verified.

The proofreading personnel then inputs the login ID and password of the proofreading personnel on a login screen 200 (FIG. 23) displayed on the display unit 62 of the proofreading terminal device 20 to log in the remote server apparatus 12. After the login, a job list screen 202 (FIG. 24) is displayed on the proofreading terminal device 20, and a list of the jobs registered in the remote server apparatus 12 is displayed. It is preferable to display only the jobs in which the access right is allocated to the logged-in proofreading personnel. When the proofreading personnel operates the mouse of the operation unit 60 to select jobs to be proofread from the jobs displayed in the list and presses a job list display button 204, the display unit 62 of the proofreading terminal device 20 displays a page list screen 206A (FIG. 25).

Figure 26:
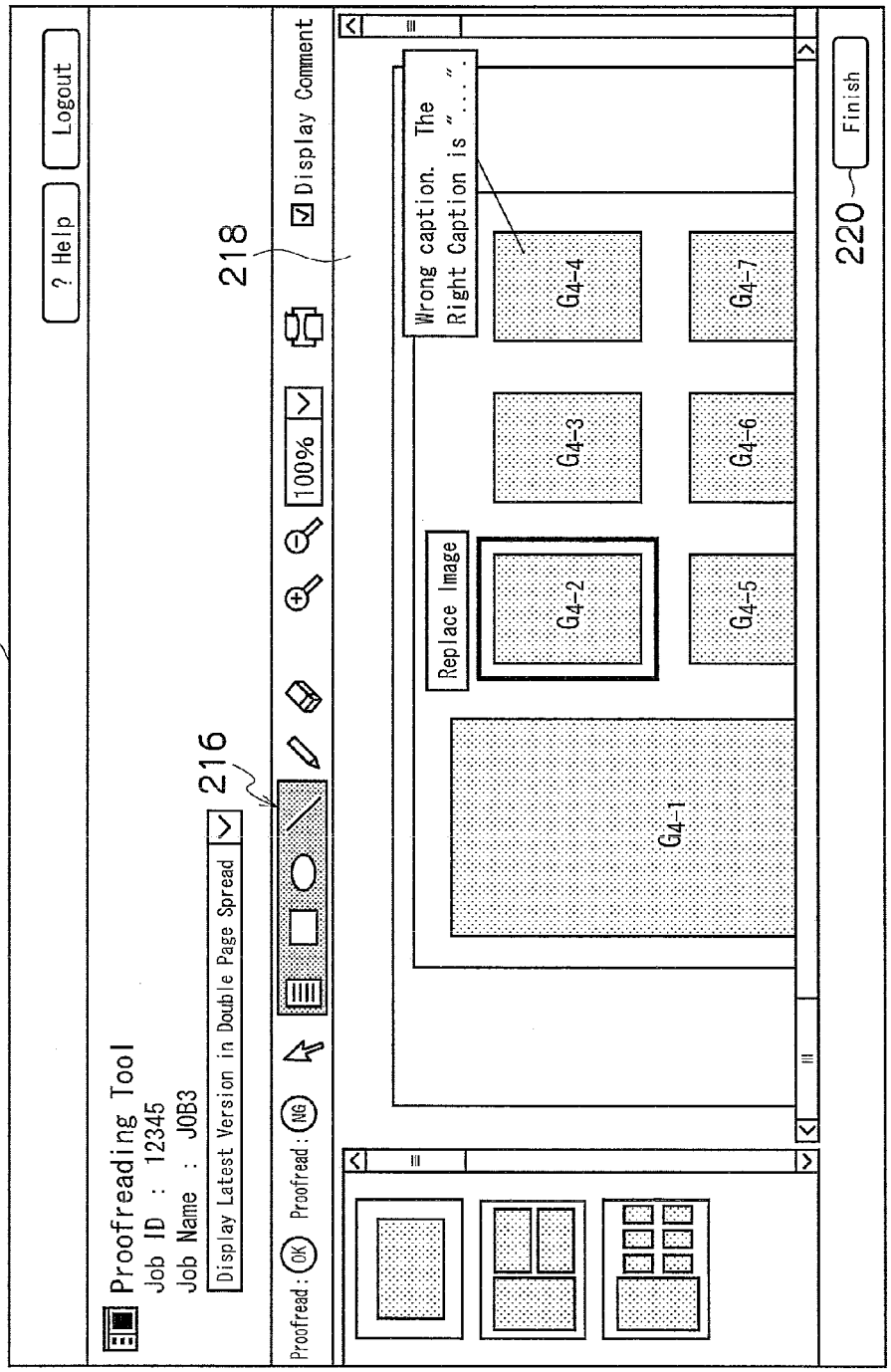
FIG. 26 is a diagram showing a proofreading tool screen of the proofreading terminal device.

When the proofreading personnel operates the mouse of the operation unit 60 to select the pages to be proofread from the page list displayed in the page list screen 206A and presses a proofreading tool button 212, a proofreading tool screen 214 as shown in FIG. 26 is displayed. This allows the proofreading personnel to use a diagram/character tool group 216 to proofread the pages to be proofread that are displayed on the page display window 218 (step S30 of FIG. 10). FIG. 26 illustrates an example of a state in which the proofreading personnel has added a comment of the replacement of images, etc., to the pages to be proofread.

When the proofreading personnel presses a finish button 220 after the proofreading is finished, the display unit 62 of the proofreading terminal device 20 displays a page list screen 206B shown in FIG. 27. The proofreading personnel presses a proofreading OK button 222 if the proofreading result of the pages to be proofread is OK and presses a proofreading NG button 224 if the result is NG. FIG. 27 illustrates that a proofreader B has performed the proofreading and that the proofreading result of the pages to be proofread is NG.

When a "Material Verification" button not shown is pressed, the "Verification Result List" shown in FIG. 1 is displayed. The proofreading personnel can see the displayed "Verification Result List" to recognize at a glance whether all registered digital materials are used.

The proofreading terminal device 20 then generates information of the proofreading performed by the proofreader and transmits the information to the remote server apparatus 12 (step S32 of FIG. 10). The remote server apparatus 12 saves the proofreading information received from the proofreading terminal device 20 in the storage unit 32 (step S34) and notifies the proofreading completion to the submission terminal device 18. At the same time, the remote server apparatus 12 creates proofread PDF and transmits the proofread PDF to the submission terminal device 18 (step S36).

The digital material management system may be applied to the terminal device (submission terminal device 18 of FIG. 4) that creates and modifies drafts. An improvement in the inspection efficiency and power saving before the submission are expected by using the digital material management system after the draft creation and before the submission.

The digital material database 2 of FIG. 2 can be stored in the remote apparatus 12 of FIG. 4 or in a storage medium managed by another server apparatus connected to the network, and the digital materials to be used can be registered through the network.

[Proofreading Checking Step to Approval Step]

The submission personnel displays the proofread PDF received from the remote server apparatus 12 on the display screen and checks the proofread content (step S38). The submission personnel then modifies the PDF documents in accordance with the proofread content and resubmits the PDF documents from the submission terminal device 18.

Figure 29:
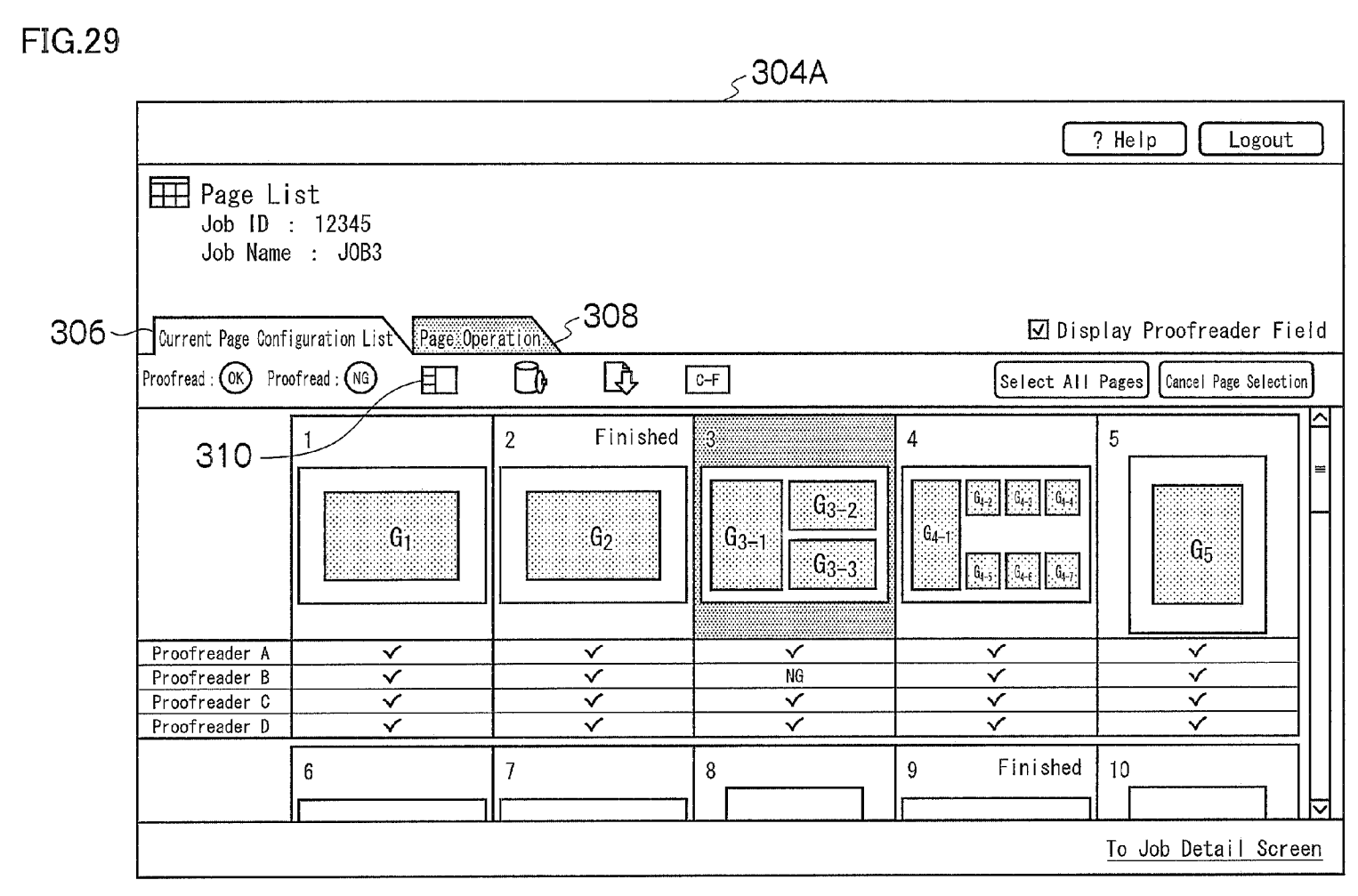
Figure 30:
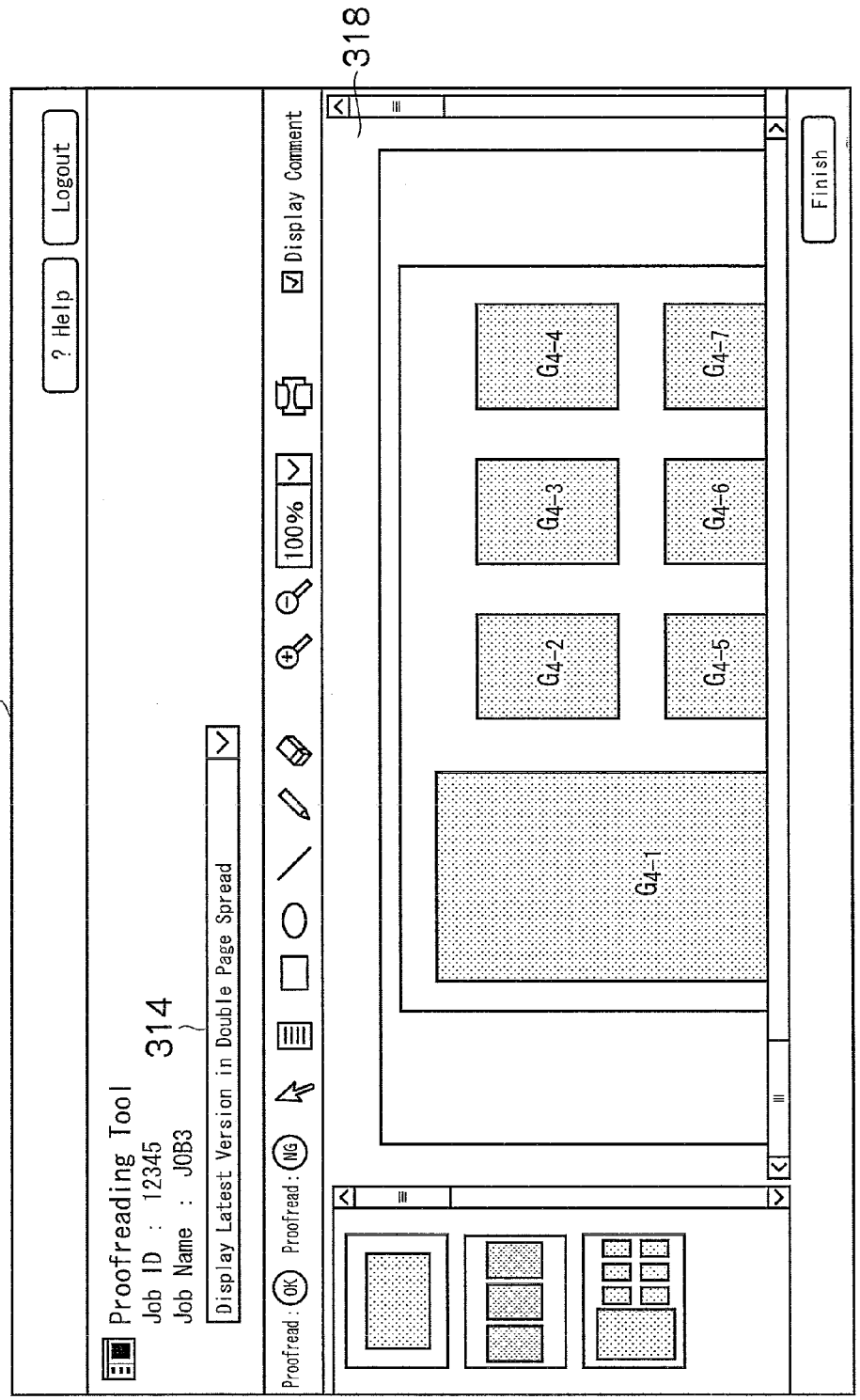
FIG. 30 is a diagram showing a proofreading tool screen of the proofreading terminal device.

Subsequently, when the proofreading personnel again logs in the remote server apparatus 12 from the proofreading terminal device 20, the display unit 62 of the proofreading terminal device 20 displays a job list screen 300A (FIG. 28). When the proofreading personnel operates the mouse of the operation unit 60 to select jobs to be proofread from the jobs displayed in the list and presses a page list display button 302, a page list screen 304A (FIG. 29) is displayed. When the pages to be proofread are further selected from the pages displayed on the page list screen 304A and a proofreading tool button 310 is pressed, a proofreading tool screen 312A (FIG. 30) is displayed.

Figure 31:
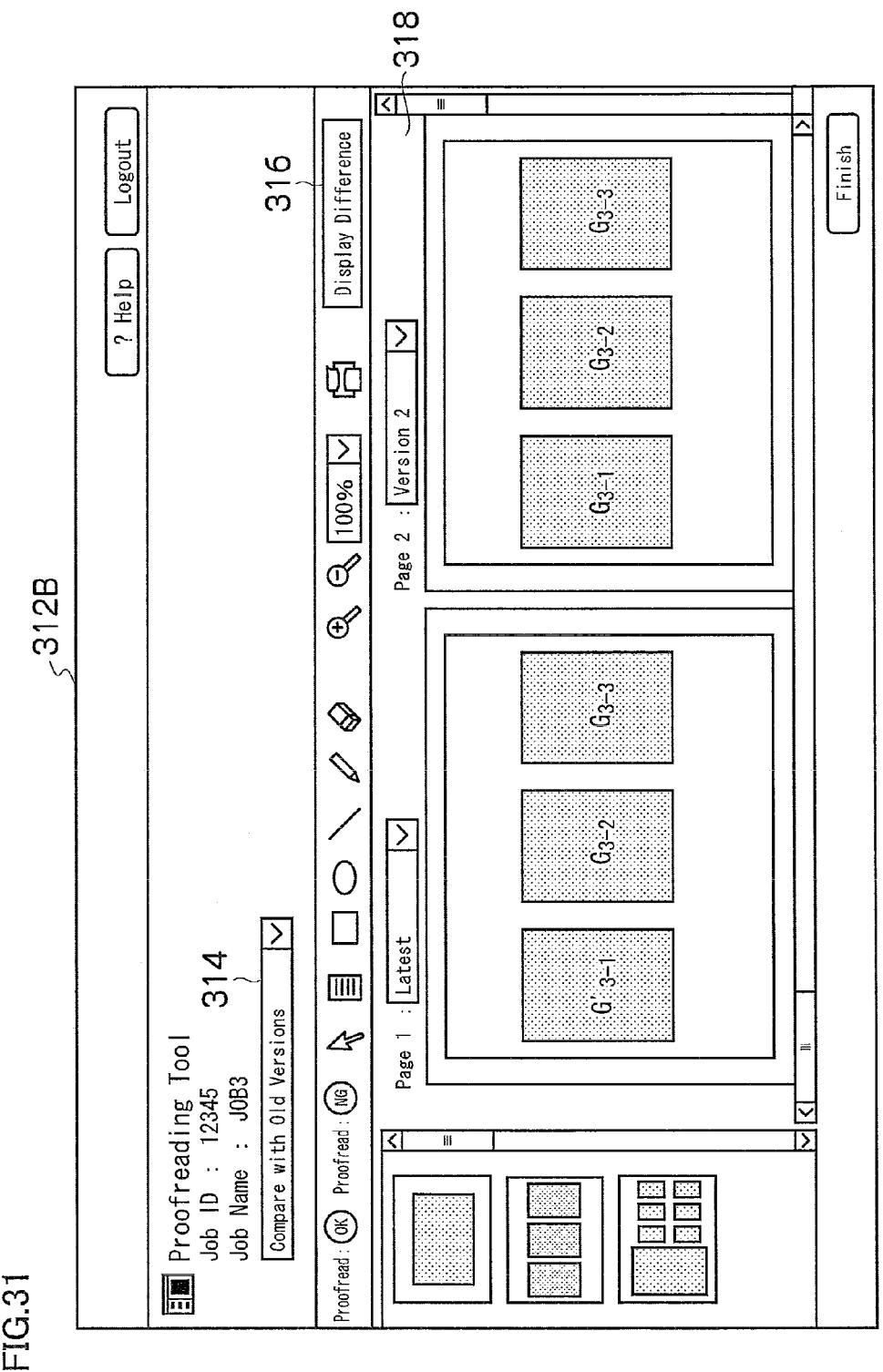
FIG. 31 is a diagram showing a proofreading tool screen of the proofreading terminal device.
Figure 32:
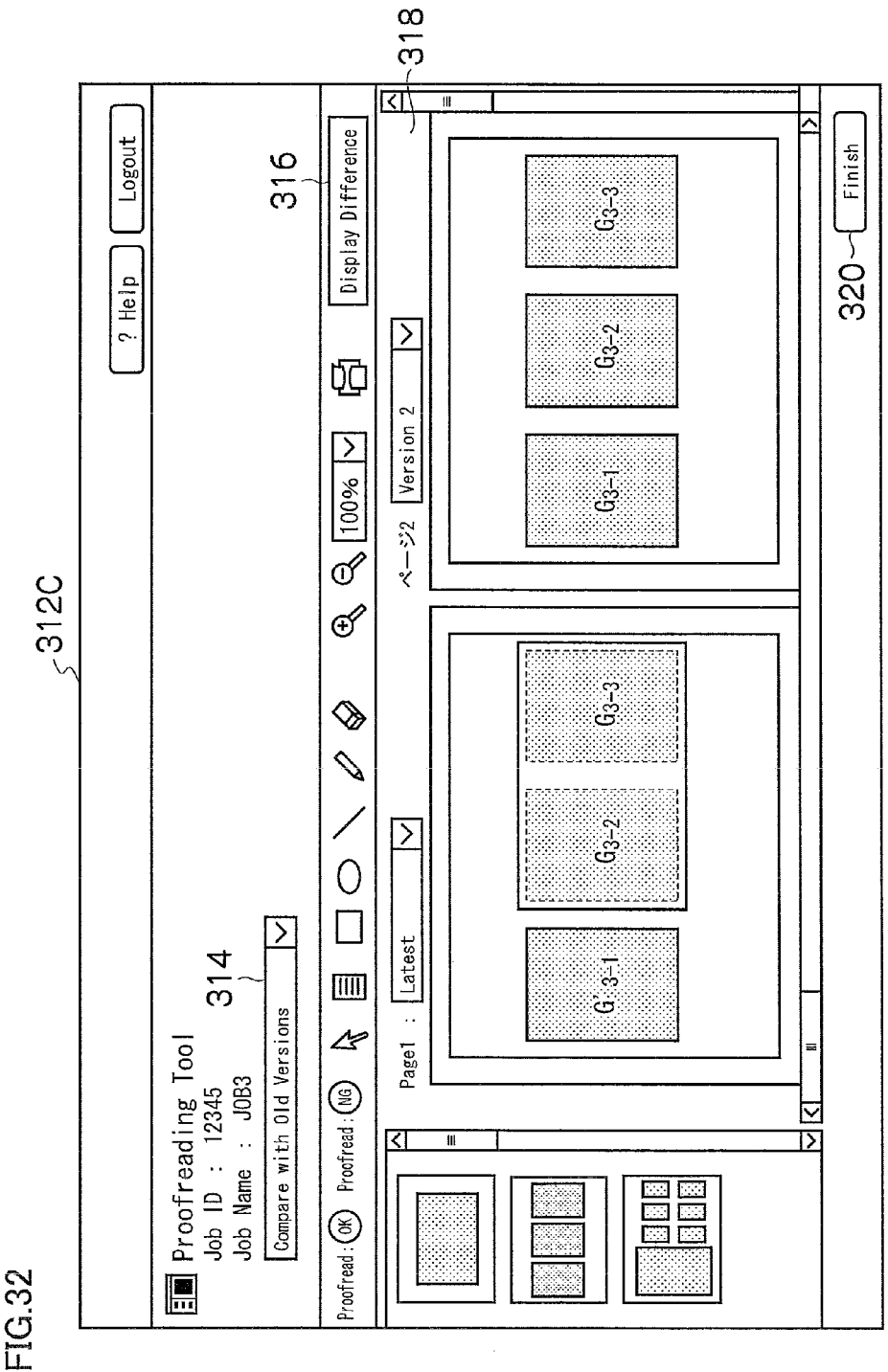
FIG. 32 is a diagram showing a proofreading tool screen of the proofreading terminal device.

When "Compare with Old Versions" is selected from a pull-down menu 314 displayed above the proofreading tool screen 312A, a page display window 318 of a proofreading tool screen 312B displays the latest version page (page on the left) and an old version page (page on the right) side by side as shown in FIG. 31. In this state, when a "Display Difference" button 316 is further pressed, the difference between the latest version page and the old version page is displayed as shown in FIG. 32, and the difference can be visually understood. Only the changed part from the old version page on the latest version page is always displayed, and the unchanged part blinks on and off at certain intervals on the display. Obviously, the difference display method is not limited to this, and the changed part may be surrounded with a frame, and a comment may be added to the changed part.

Figure 33:
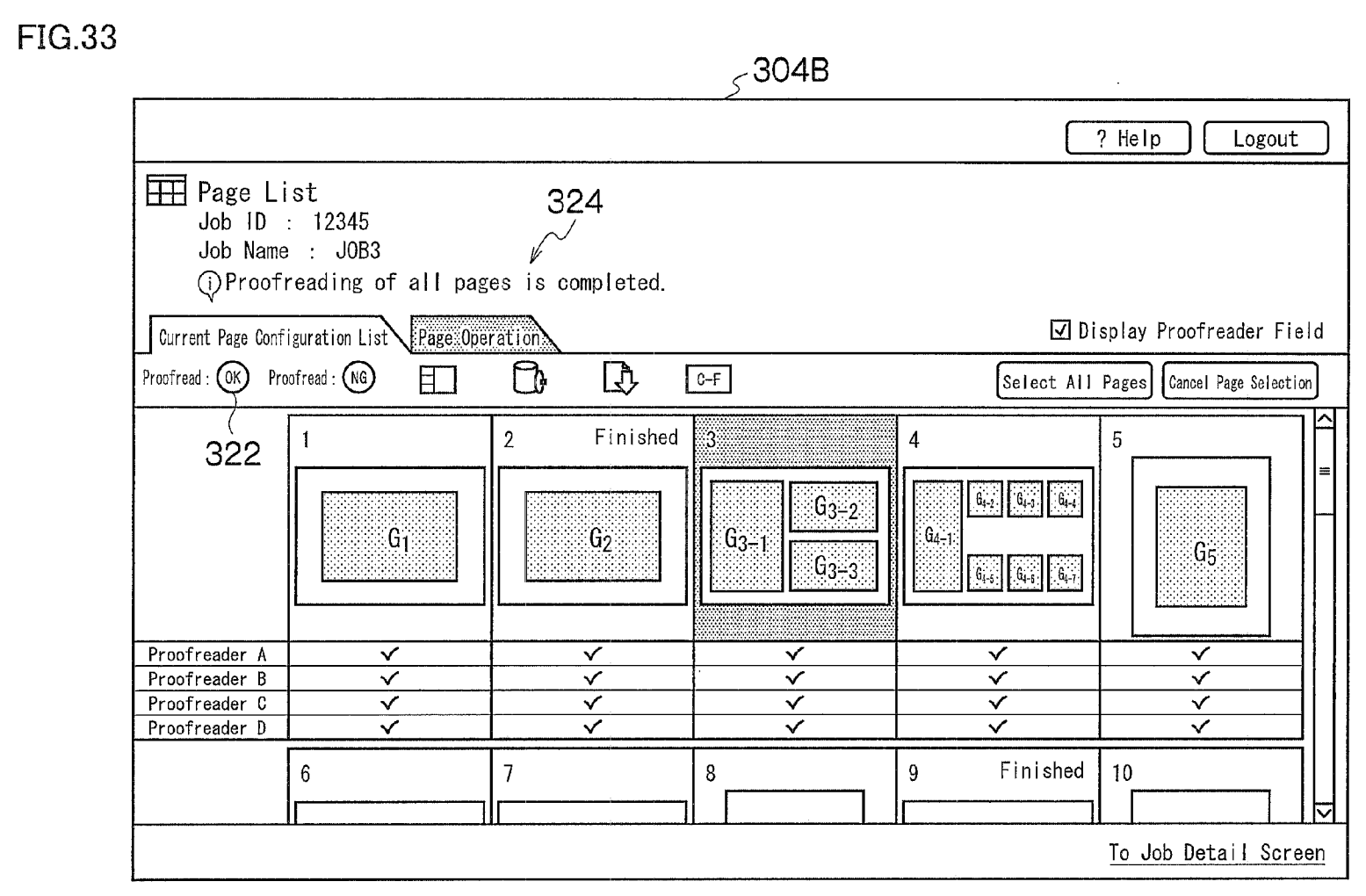

This allows the proofreading personnel to easily check whether the drafts are modified as instructed. When the proofreading personnel presses a finish button 320, the display unit 62 of the proofreading terminal device 20 displays a page list screen 304B (FIG. 33). If the proofreading result is OK, a proofreading OK button 322 is pressed. At this point, if the proofreading of all pages of the drafts is completed, a message 324 "Proofreading of all pages is completed." is displayed as shown in FIG. 33. In this way, the resubmission and proofreading are repeated until the proofreading of all pages of the drafts is completed. When the proofreading of all pages is completed (proofreading completion, step S40), the result is notified to the remote server apparatus 12, and the job approval is registered in the remote server apparatus 12 (step S42).

[Print Instruction Step]

When the print instruction personnel (printing company) logs in the remote server apparatus 12 from the job creation/management terminal device 16, the display unit 62 of the job creation/management terminal device 16 displays a job list screen 330 (FIG. 34). When a job, to which a print instruction will be issued, is selected from the jobs displayed in the list on the job list screen 330 and a print instruction button 332 is pressed, the job creation/management terminal device 16 issues a print instruction to the remote server apparatus 12 (step S44), and the remote server apparatus 12 further creates a print job and transmits the print job to the print process server apparatus 14 (step S46). For example, the print job is created in a JDF-compliant PDF/X-based file format and provided to the print process server apparatus 14. After receiving the print job from the remote server apparatus 12, the print process server apparatus 14 registers the print job (step S48).

In this way, the print preparation of the printers arranged in association with the print process server apparatus 14 is completed, and the printers perform print operations in accordance with the registered print jobs. The printers 24 and 26 described in FIG. 4, which are devices compliant to JDF, can execute automatic processing up to the output in accordance with the description of JDF received from the print process server apparatus 14.

In the workflow management system according to the embodiment, since complete data is submitted in upstream steps, the printing company can perform automatic processing and easily recognize the progress of each job. The print instruction can also be electronically issued.

The proofreading personnel (such as advertising agency and client) can immediately issue a proofreading instruction, check the proofreading history, and immediately check the content edited by the draft creator (such as designer). There is also an advantage that the approval result can be left as evidence.

Especially, according to the embodiment, part of the pages of the printed material can be partially submitted, and the newly submitted pages of drafts can be allocated by replacing the already allocated pages of drafts by the new pages or by inserting the new pages between the pages. Therefore, only the modified pages, not all pages, can be submitted even when the resubmission is necessary, and the order of pages can be edited after the submission. When a plurality of draft creators create drafts of printed materials, after pages that each creator takes charge are created, the pages can be submitted without waiting for the completion of other pages. Therefore, the page order edit can be comprehensively managed, the operation efficiency of submission improves, and fast submission is possible. When the pages are replaced, old pages are not completely deleted from the system but can be restored based on the page history management.

In the embodiment, to realize the partial submission, versions of the printed materials are managed by managing the page-by-page versions (version management) of the drafts of printed materials. Thus, as shown in FIG. 35, the version numbers are managed page by page. The latest version numbers of pages do not have to be the same, but may be different. In an example of FIG. 35, the latest version numbers of pages are as follows: two versions for pages 1 and 2, one version for page 3, and three versions for page 4. Not only the latest version numbers of pages, but also the pages of old version numbers are stored in the system (storage unit 32 of remote server apparatus 12) page by page. As shown in FIG. 36, the version management of the printed materials is held as information of combinations of versions of pages constituting the printed materials. In an example of FIG. 36, the first version (version 1) of the printed material is constituted only by page 1 (version 1) and page 2 (version 1). Subsequently, the partial submission is performed page by page, and the version numbers of pages are updated page by page as necessary. In the version 5 of the printed material, pages 1 and 2 are version 2, page 3 is version 1, and page 4 is version 3.

The version management of printed materials based on the page by page version management can realize more effective partial submission. As a result, even if only part of pages of drafts needs to be partially modified, only the modified pages can be partially submitted without newly submitting all pages of the drafts. As a result, fast and efficient submission operations can be realized. In the proofreading step, the proofreading is performed so that whether digital materials that should be used (registered digital materials) are all used in the draft for printing can be automatically detected and checked. Therefore, the step contributes to the improvement in the operation efficiency of the proofreading personnel and the power saving.

Although the digital material management method, system, and the workflow management system of the present invention have been described in detail, the present invention is not limited to the above example. It is obvious that various modifications and changes can be made without departing from the scope of the present invention.

What is claimed is:

1. A digital material management method applied to a digital material management system which manages a digital material, comprising:
    a material registration step of registering a plurality of digital materials that should be used for a product in a digital material storage device in the digital material management system;
    a selection step of selecting a digital material that should be used for the product from a plurality of the digital materials stored in the digital material storage device;
    a submission step of submitting a draft created by the material selected in the selection step from a draft submission device in the digital material management system;
    a verification step of automatically verifying with a verification device in the digital material management system, the digital materials that should be used and the digital materials that are actually used in the draft submitted from the draft submission device to verify that all of the digital materials that should be used are used;
    a display step of displaying the result of the verification step on a display device in the digital material management system;
    a step of selecting unused digital materials from the plurality of registered digital materials in the digital material storage device if the verification step verifies that not all digital materials that should be used are used,
    wherein the digital materials include images and information associated with the images.

2. The digital material management method according to claim 1, further comprising:
    a preflight processing step of applying a preflight process to the verified product after the verification step if the verification step verifies that all digital materials that should be used are used.

3. The digital material management method according to claim 1, wherein
    in the selection step, the digital materials are assumed to be selected by checking out the digital materials to be used.

4. The digital material management method according to claim 1, wherein
    in the material registration step, at least one of a requester that has requested manufacturing of the product and a manufacturer of the digital materials registers the digital materials.

5. The digital material management method according to claim 1, wherein
    the product includes at least one of a printed material and web contents that can be browsed by a web browser function.

6. The digital material management method according to claim 1, wherein
the images include item images.

7. The digital material management method according to claim 1, wherein
the information is item information including at least one of item name, item number, and price.

8. The digital material management method according to claim 1, further comprising
a proofreading step of proofreading the product, wherein
the verification step is performed before the proofreading step.

9. The digital material management method according to claim 8, wherein
the product is proofread in the proofreading step after the preflight processing step.

10. The digital material management method according to claim 1, further comprising
the display step displays the verification result in the verification step in a list format on the display device.

11. The digital material management method according to claim 10, wherein
the product includes a plurality of pages, and the verification result is displayed page by page in the display step.

12. The digital material management method according to claim 10, wherein the display step displays matching or mismatching of the digital materials that should be used and the digital materials actually used in the product that are verified in the verification step on the display device.

13. A digital material management system managing a digital material, comprising:
a digital material storage device that stores a plurality of digital materials that should be used for a product;
a selection device that selects a digital material that should be used for the product from a plurality of the digital materials stored in the digital material storage device;
a submission device that submits a draft created by the material selected by the selection device;
a verification device that automatically verifies the digital materials that should be used and the digital materials that are actually used in the draft submitted from the draft submission device to verify that all of the digital materials that should be used are used; and
a display device that displays the result of the verification by the verification device,
wherein the selection device selects unused digital materials from the plurality of registered digital materials in the digital material storage device if the verification device verifies that not all digital materials that should be used are used,
wherein the digital materials include images and information associated with the images.

14. A workflow management system comprising:
a server apparatus; and
a terminal device connected to the server apparatus through a network, wherein
the server apparatus comprises:
a digital material storage device that stores a plurality of digital materials that should be used for a product;
a selection device that selects a digital material that should be used for the product from a plurality of the digital materials stored in the digital material storage device;
a submission device that submits a draft created by the material selected by the selection device;
a verification device that automatically verifies, the digital materials that should be used and the digital materials that are actually used in the draft submitted from the draft submission device to verify that all of the digital materials that should be used are used; and
a display device that displays the result of the verification by the verification device,
wherein the selection device selects unused digital materials from the plurality of registered digital materials in the digital material storage device if the verification device verifies that not all digital materials that should be used are used,
wherein the digital materials include images and information associated with the images.

15. The workflow management system according to claim 14, further comprising a printing apparatus that is connected to the terminal device and that performs printing in accordance with an instruction fed from the terminal device.

* * * * *